(12) United States Patent
Volkerink et al.

(10) Patent No.: US 11,861,441 B1
(45) Date of Patent: Jan. 2, 2024

(54) SPREADING OUT ELECTRONICS IN AN INTERNET OF THINGS DEVICE FOR RESILIENCY TO ENVIRONMENTAL HAZARDS

(71) Applicant: Trackonomy Systems, Inc., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/558,556

(22) Filed: Dec. 21, 2021

Related U.S. Application Data

(60) Provisional application No. 63/128,377, filed on Dec. 21, 2020, provisional application No. 63/130,331, filed on Dec. 23, 2020, provisional application No. 63/141,149, filed on Jan. 25, 2021.

(51) Int. Cl.
| | |
|---|---|
| *G06K 19/07* | (2006.01) |
| *G06K 19/077* | (2006.01) |
| *G06K 19/06* | (2006.01) |
| *H04W 76/15* | (2018.01) |
| *H04W 84/18* | (2009.01) |

(52) U.S. Cl.
CPC ... *G06K 19/0776* (2013.01); *G06K 19/06037* (2013.01); *H04W 76/15* (2018.02); *H04W 84/18* (2013.01)

(58) Field of Classification Search
CPC ....... A61B 5/00; A61B 5/0002; A61B 6/6833; G06K 9/00; G06K 9/0004; G06K 9/20; G06K 9/209; G06K 19/00; G06K 19/06037; G06K 19/07; G06K 19/0776; G09G 3/20; G09G 3/2074; G09F 9/30; G09F 9/302; G09F 9/3026; H05K 5/00; H05K 5/02

See application file for complete search history.

(56) References Cited

U.S. PATENT DOCUMENTS

| | | | |
|---|---|---|---|
| 2004/0075616 A1 | 4/2004 | Endo et al. | |
| 2008/0122631 A1 | 5/2008 | Kodukula et al. | |
| 2009/0308638 A1* | 12/2009 | Cho | H05K 3/361 |
| | | | 427/98.5 |
| 2010/0314443 A1 | 12/2010 | Cudzilo | |

(Continued)

FOREIGN PATENT DOCUMENTS

| | | |
|---|---|---|
| JP | 2003-209421 A | 7/2003 |
| WO | WO 2019/118440 A1 | 6/2019 |

OTHER PUBLICATIONS

NPL Search (Apr. 4, 2023).*

(Continued)

*Primary Examiner* — Van T Trieu

(57) ABSTRACT

A resilient flexible adhesive tape platform includes a flexible substrate, a flexible cover layer on the flexible substrate, a device layer in between the flexible substrate and the flexible cover layer comprising components connected to a resilient printed circuit board, and the resilient printed circuit board (PCB) in between the flexible substrate and the flexible cover layer. The flexible printed circuit board includes a resilient conductive trace on the PCB connecting two of the components, the resilient conductive trace comprising a plurality of sub-traces, each of the plurality of sub-traces electrically redundantly connecting the two electronic components to each other.

19 Claims, 27 Drawing Sheets

(56) References Cited

U.S. PATENT DOCUMENTS

| | | |
|---|---|---|
| 2011/0101108 A1 | 5/2011 | Slikkerveer et al. |
| 2014/0217373 A1* | 8/2014 | Youn .................... H10K 59/805 |
| | | 438/23 |
| 2015/0248604 A1 | 9/2015 | Diorio et al. |
| 2016/0140882 A1* | 5/2016 | Doebelt ................ G06F 3/0412 |
| | | 361/749 |
| 2020/0151655 A1 | 5/2020 | Khoche |
| 2021/0259634 A1* | 8/2021 | Ginestet ............... A61B 5/0002 |

OTHER PUBLICATIONS

International Search Report and Written Opinion of the International Searching Authority for International Patent Application No. PCT/US2021/049325 dated Dec. 16, 2021, 13 pages.

\* cited by examiner

1700

Connect at least two components of a resilient tape node with a conductive trace that includes at least two redundant sub-traces connected in parallel
1710

Measure initial resistance or impedance across the trace at two contact points
1720

Store the initial resistance or impedance
1730

Track asset using resilient tape node
1740

Measure new resistance or impedance across the trace the two contact points
1750

Responsive to the new resistance being higher than the initial resistance by at least a threshold amount, determine that one of the redundant sub-traces has been damaged
1760

```
┌─────────────────────────────────────────────────────────────────────────┐
│ Activate a first redundant component of a circuit, the first redundant  │
│ component connected to a first redundant trace of the circuit           │
│ 2010                                                                    │
└─────────────────────────────────────────────────────────────────────────┘
                                    ▼
┌─────────────────────────────────────────────────────────────────────────┐
│ Measure initial resistance or impedance across the redundant traces     │
│ 2020                                                                    │
└─────────────────────────────────────────────────────────────────────────┘
                                    ▼
┌─────────────────────────────────────────────────────────────────────────┐
│ Store the initial resistance or impedance values                        │
│ 2030                                                                    │
└─────────────────────────────────────────────────────────────────────────┘
                                    ▼
┌─────────────────────────────────────────────────────────────────────────┐
│ Track asset using resilient tape node                                   │
│ 2040                                                                    │
└─────────────────────────────────────────────────────────────────────────┘
                                    ▼
┌─────────────────────────────────────────────────────────────────────────┐
│ Measure new resistance or impedance across the redundant traces         │
│ 2050                                                                    │
└─────────────────────────────────────────────────────────────────────────┘
                                    ▼
┌─────────────────────────────────────────────────────────────────────────┐
│ Responsive to the new resistance or impedance being different from the  │
│ initial resistance or impedance by a first amount, determine that the   │
│ first redundant trace has been damaged                                  │
│ 2060                                                                    │
└─────────────────────────────────────────────────────────────────────────┘
                                    ▼
┌─────────────────────────────────────────────────────────────────────────┐
│ Responsive to determining that one of the redundant traces is damaged,  │
│ deactivate the first redundant component and activate a second          │
│ redundant component                                                     │
│ 2070                                                                    │
└─────────────────────────────────────────────────────────────────────────┘
```

FIG. 20

SPREADING OUT ELECTRONICS IN AN INTERNET OF THINGS DEVICE FOR RESILIENCY TO ENVIRONMENTAL HAZARDS

CROSS-REFERENCE TO RELATED APPLICATIONS

This application claims priority to U.S. Provisional Patent Application No. 63/128,377, filed on Dec. 21, 2020, and to U.S. Provisional Patent Application No. 63/130,331, filed on Dec. 23, 2020, and to U.S. Provisional Patent Application No. 63/141,149, filed on Jan. 25, 2021, all of which are hereby incorporated herein in their entirety.

FIELD OF THE DISCLOSURE

This disclosure generally relates to wireless internet of things (IOT) devices, and specifically to devices for asset tracking and management.

BACKGROUND

In certain situations, tracking devices physically attached to assets may be exposed to physical damage or trauma. In particular, environments related to shipping, storing, industrial machinery, logistics, or other environments where asset tracking is useful, the assets being tracked may be handled roughly or interact with machinery that can damage parts of the asset or tracking devices that are attached to the assets. Damage to a PCB or other components of a conventional tracking device may result in the loss of critical functionality of the conventional tracking device.

SUMMARY

A resilient flexible adhesive tape platform includes a flexible substrate, a flexible cover layer on the flexible substrate, a device layer in between the flexible substrate and the flexible cover layer comprising components connected to a resilient printed circuit board, and the resilient printed circuit board (PCB) in between the flexible substrate and the flexible cover layer. The flexible printed circuit board includes a resilient conductive trace on the PCB connecting two of the components, the resilient conductive trace comprising a plurality of sub-traces, each of the plurality of sub-traces electrically redundantly connecting the two electronic components to each other.

In embodiments, a resilient wireless tracking device includes a printed circuit board (PCB), at least two electronic components on the PCB, at least one conductive trace on the PCB. The conductive trace includes a plurality of sub-traces, each of the plurality of sub-traces electrically connecting the at least two electronic components to each other. The conductive trace is configured to maintain the electrical connection between the at least two electronic components even when one or more of the plurality of sub-traces is damaged or broken.

In embodiments, a method is disclosed for switching between redundant components in a circuit, in response to detecting that a conductive trace is broken or damaged. The method includes activating a first redundant component of a circuit, the circuit comprising a first component, a plurality of redundant traces comprising a first redundant trace connecting the first component to a first redundant component and a second redundant trace connecting the first component to a second redundant component. A first impedance is measured across the plurality of redundant traces and the first impedance is stored. After a period of use, a second impedance is measured across the plurality of redundant traces. Responsive to the measured second impedance being different from the stored first impedance by a first amount, it is determined that the first redundant trace has been damaged. Responsive to the determining that the first redundant trace has been damaged, first redundant component is deactivated and the second redundant component is activated. The second redundant component is configured to perform the same functions as the first redundant component.

BRIEF DESCRIPTION OF THE DRAWINGS

FIG. 17 is a flowchart showing a method of detecting damage to a conductive trace in a printed circuit board, according to some embodiments.

FIG. 20 is a flowchart showing a method of switching between redundant components of a circuit, according to some embodiments

DETAILED DESCRIPTION

Figure 1A:
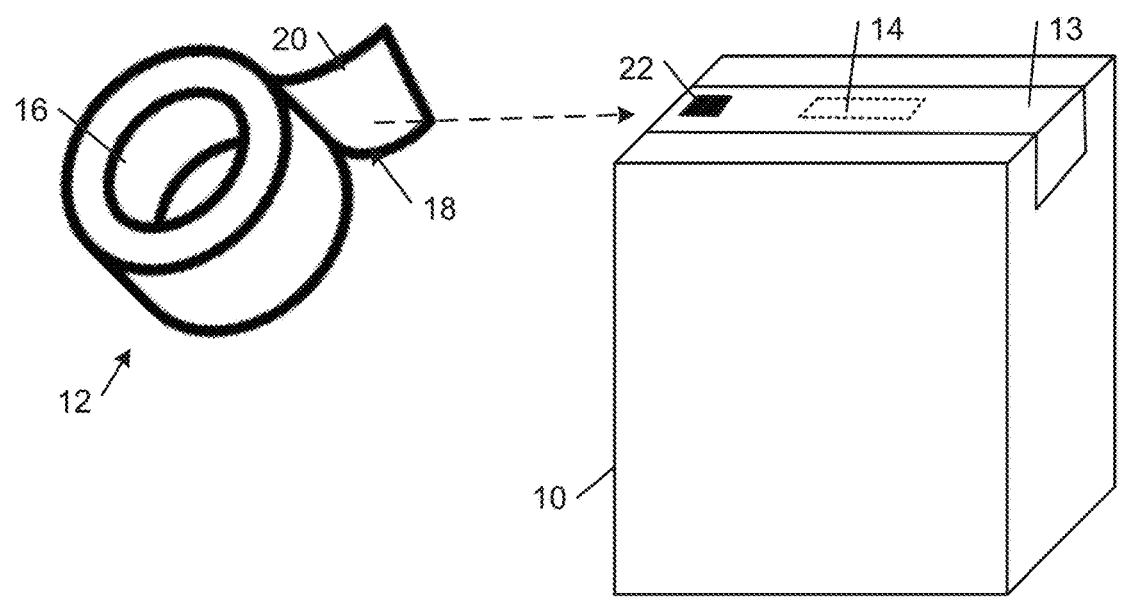
FIG. 1A is a diagrammatic view of an asset that has been sealed for shipment using a segment of an example adhesive tape platform dispensed from a roll, according to some embodiments.

A wireless tracking device is disclosed herein that is resilient to physical damage. The wireless tracking device is configured to maintain an electrical connection between two or more electronic components on a PCB when one or more traces of the PCB are damaged. In some embodiments, the wireless tracking device includes redundant parts that allows for the wireless tracking device to receive physical damage without losing functionality.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

INTRODUCTION

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
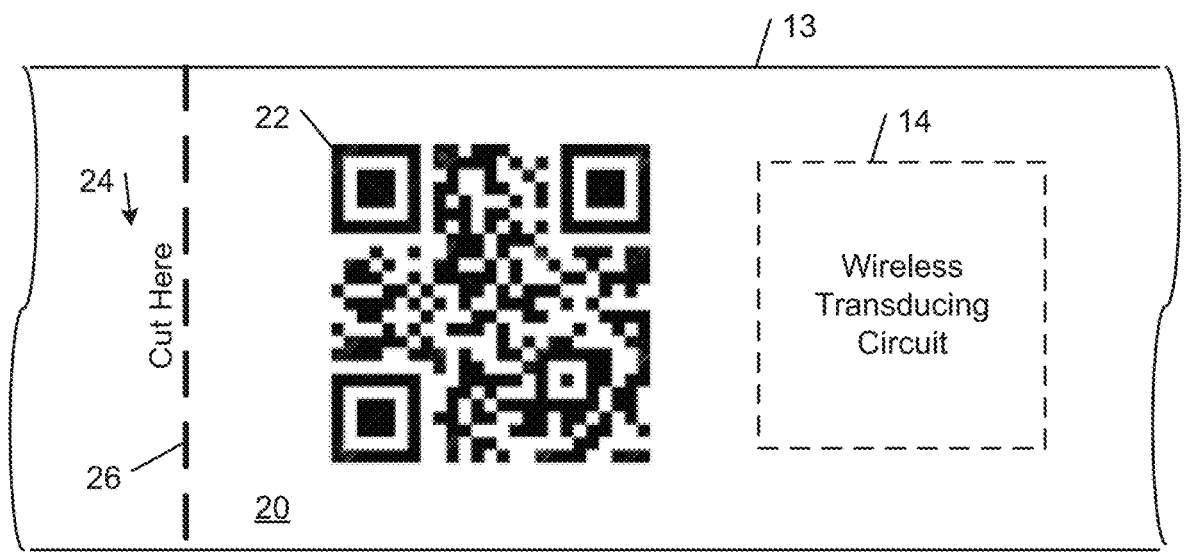
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
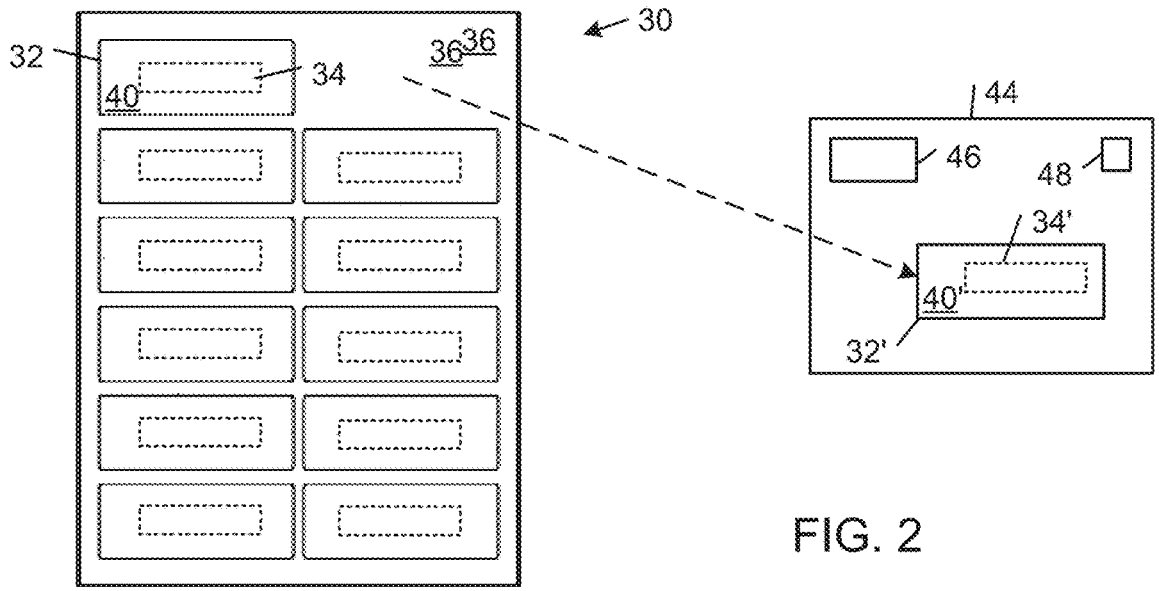
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
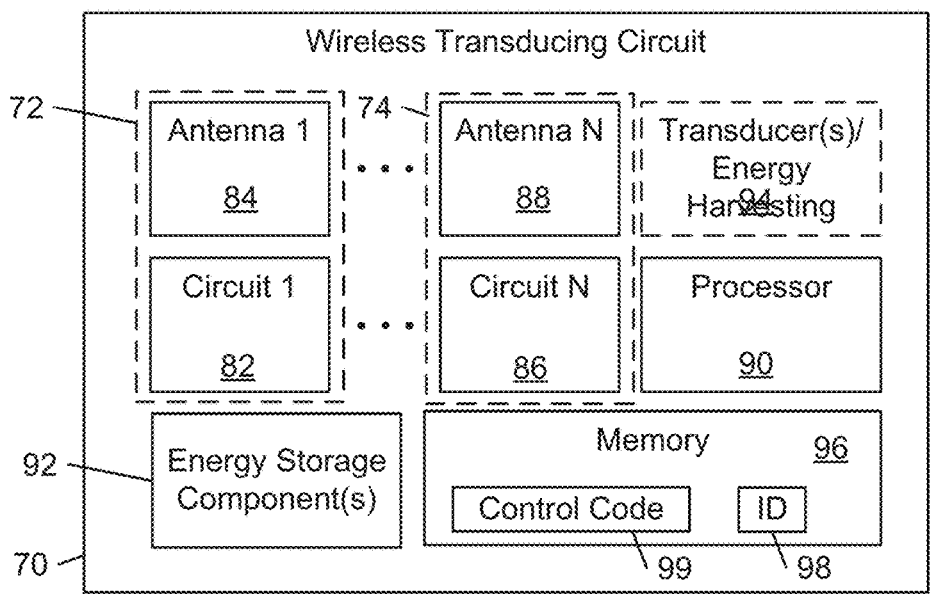
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
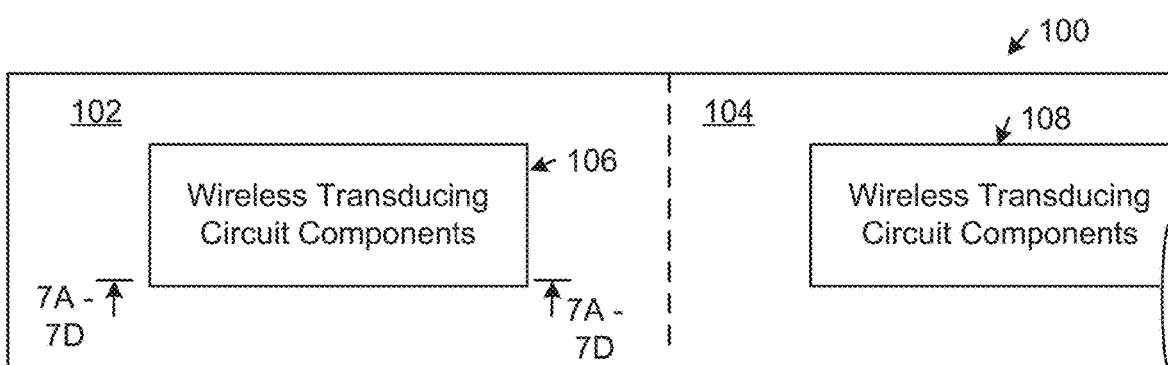
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
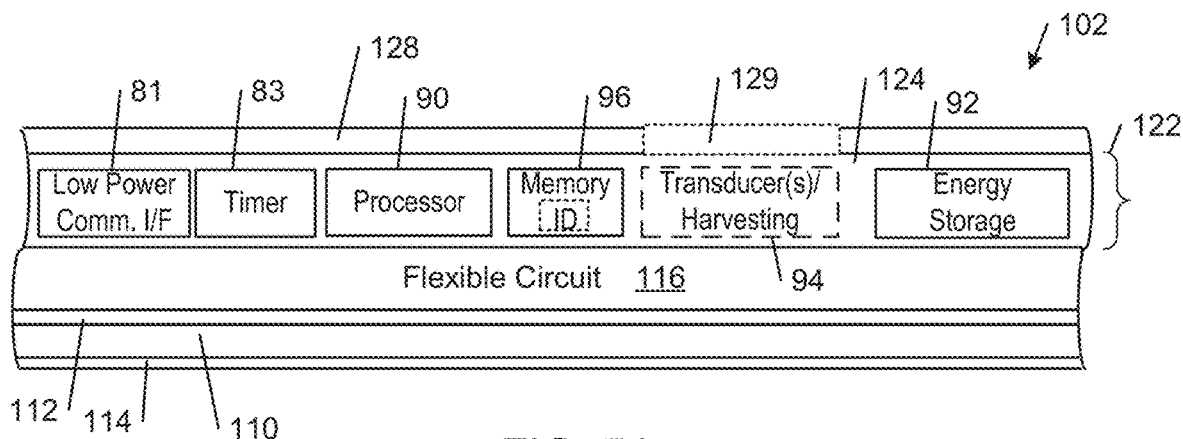
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
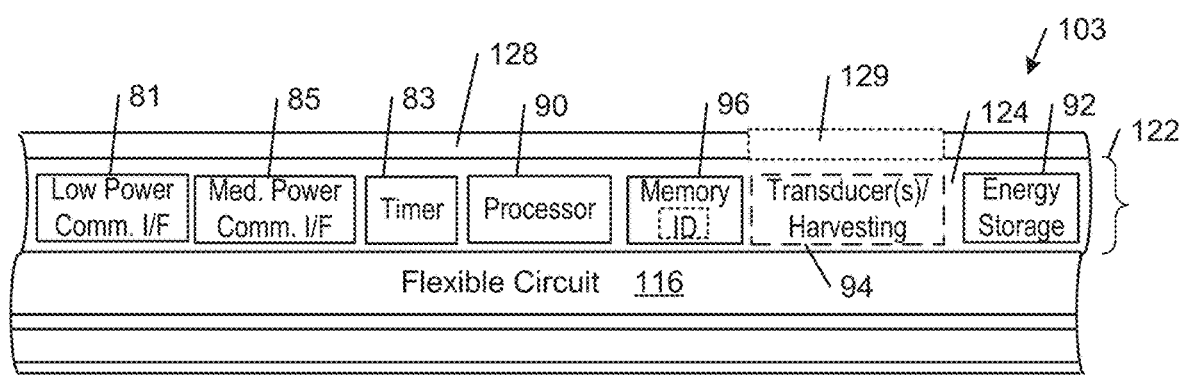

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
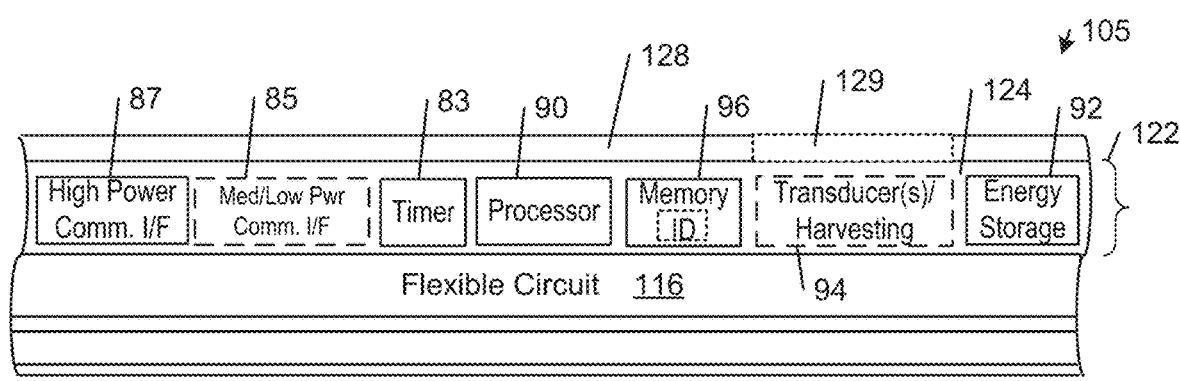

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multistep etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
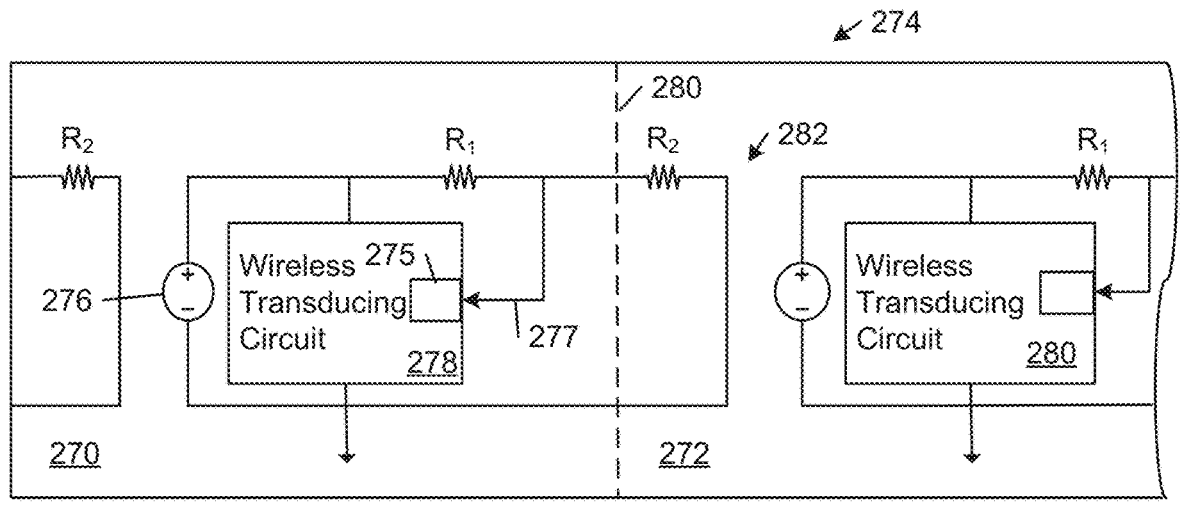
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
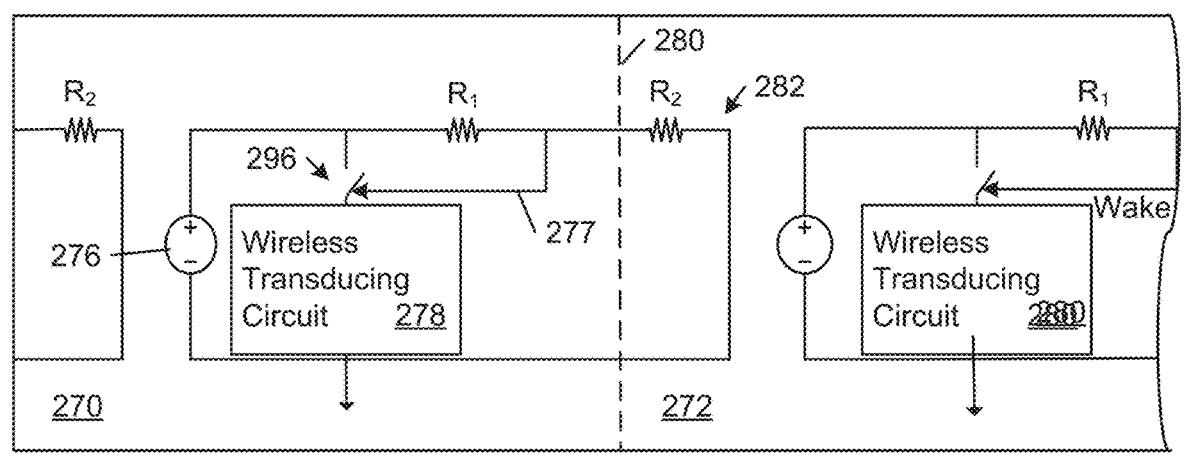

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
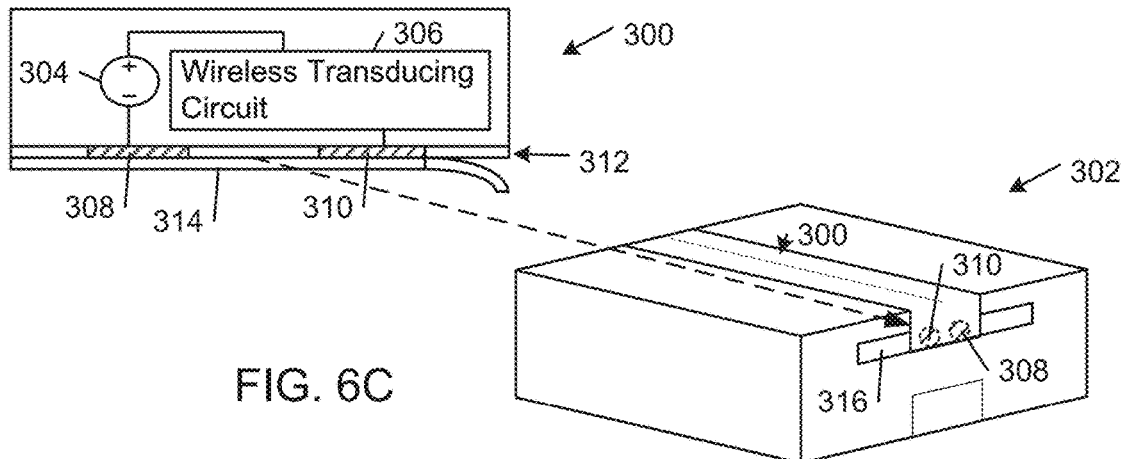
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
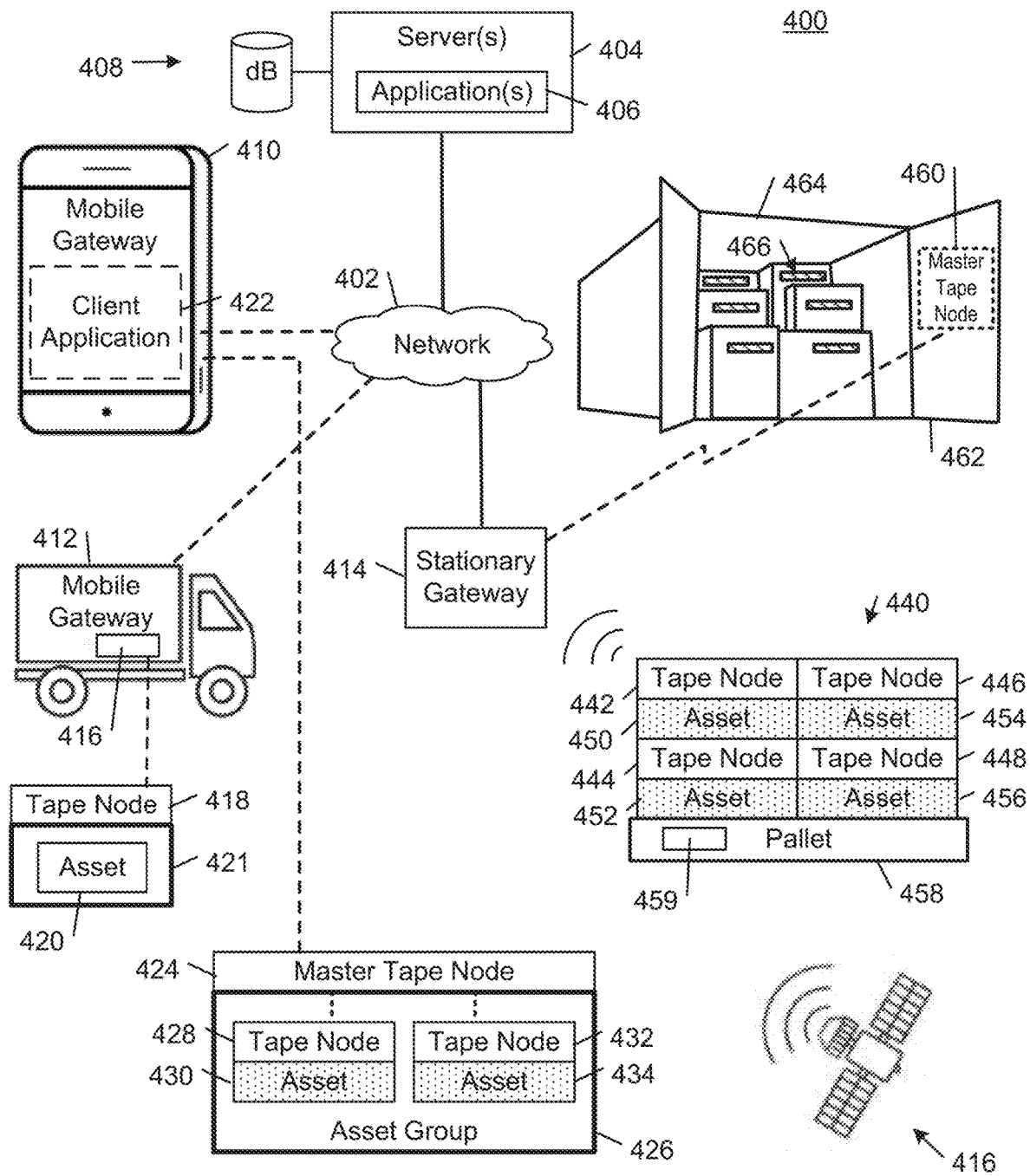
FIG. 7 is a diagrammatic view of an example of a network environment supporting communications with segments of an adhesive tape platform, according to some embodiments.

FIG. 7 shows an example network communications environment 400 (also referred to herein as an  system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things). Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
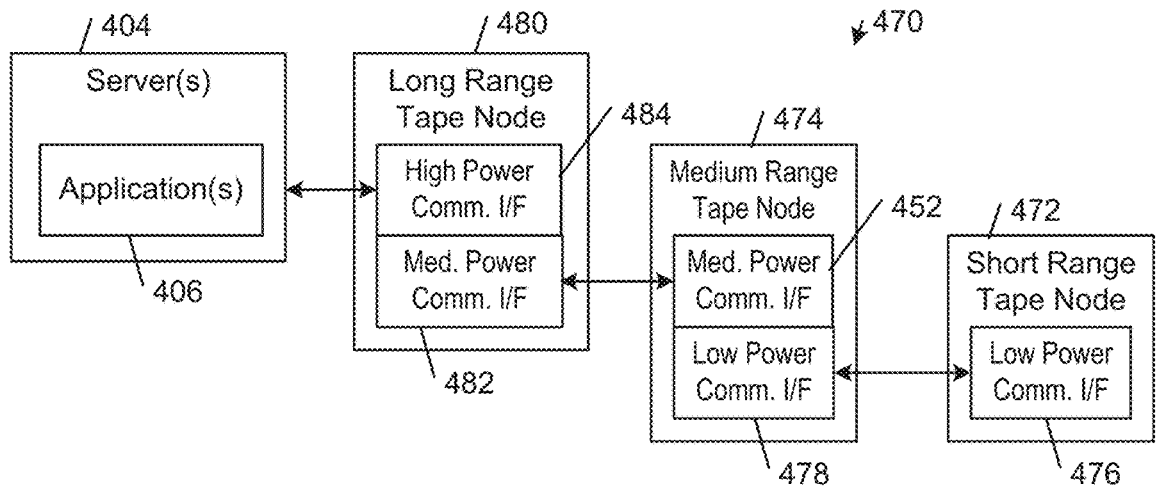
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
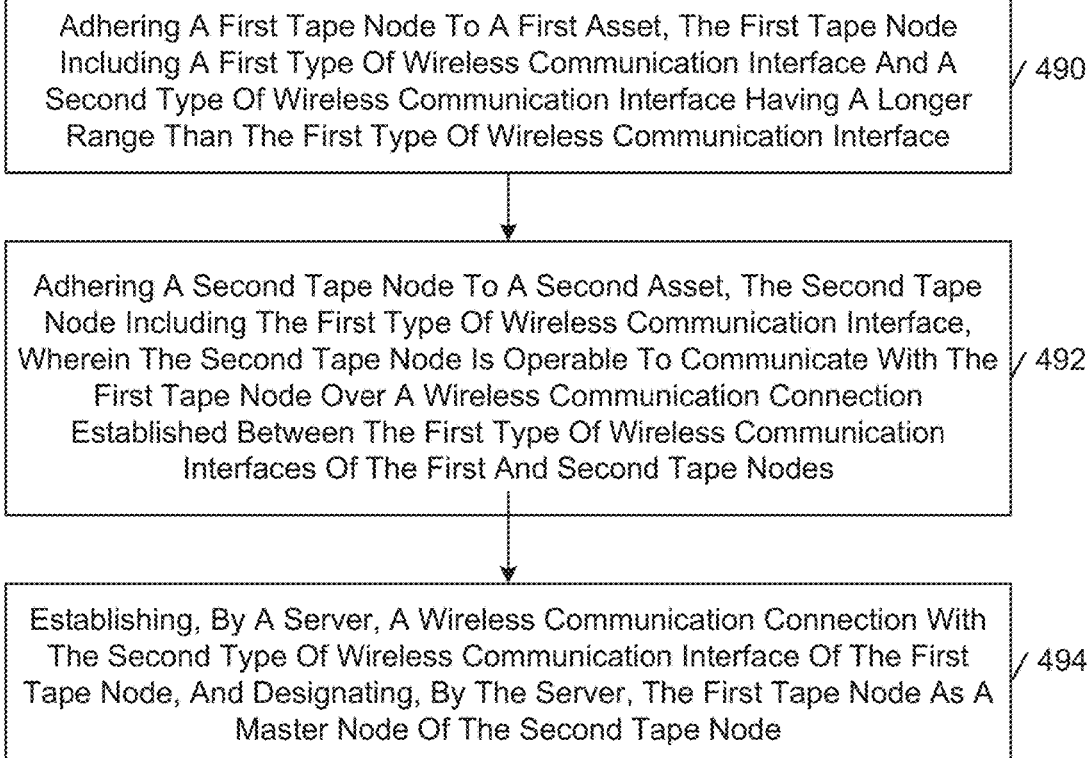
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
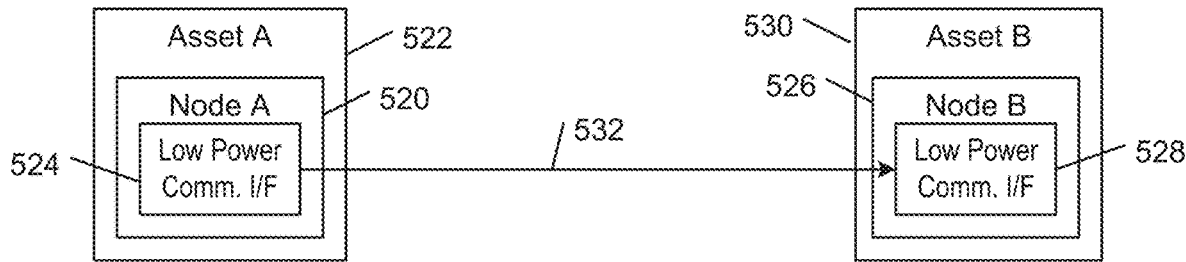
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
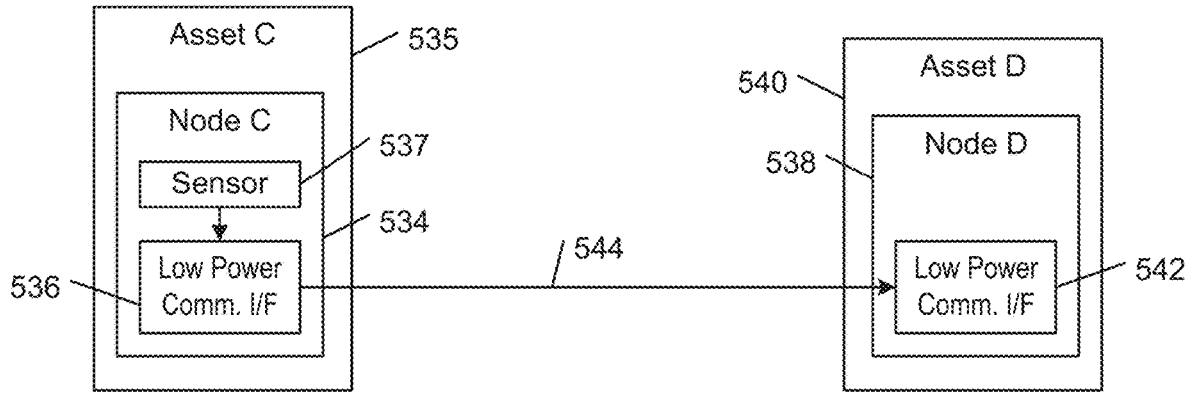

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
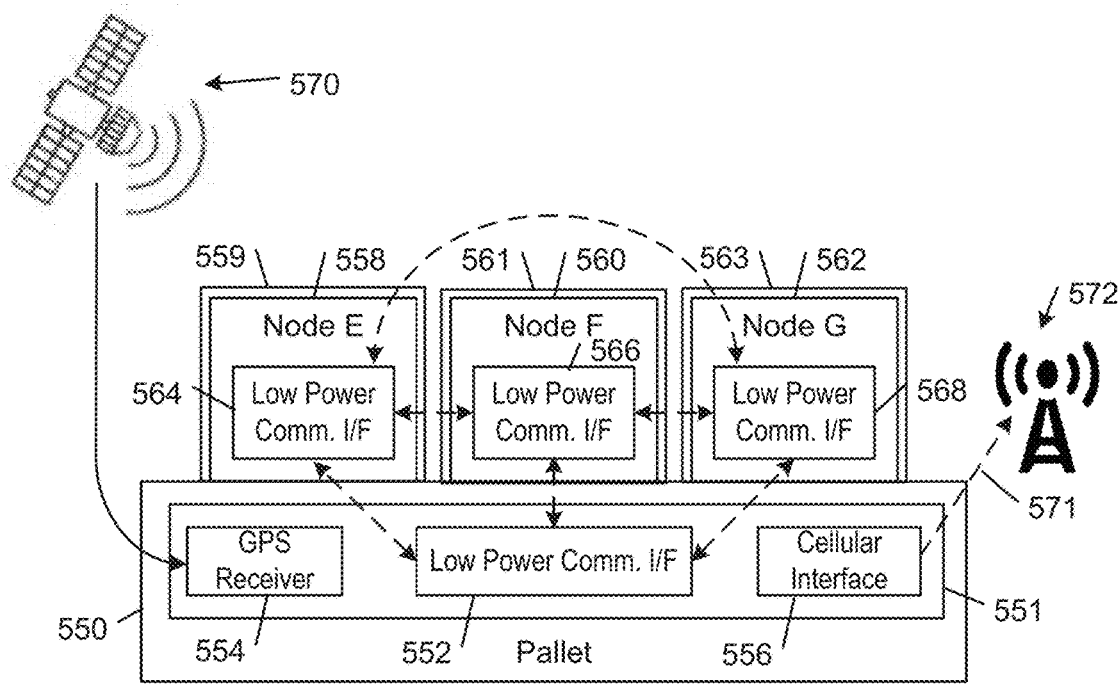

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
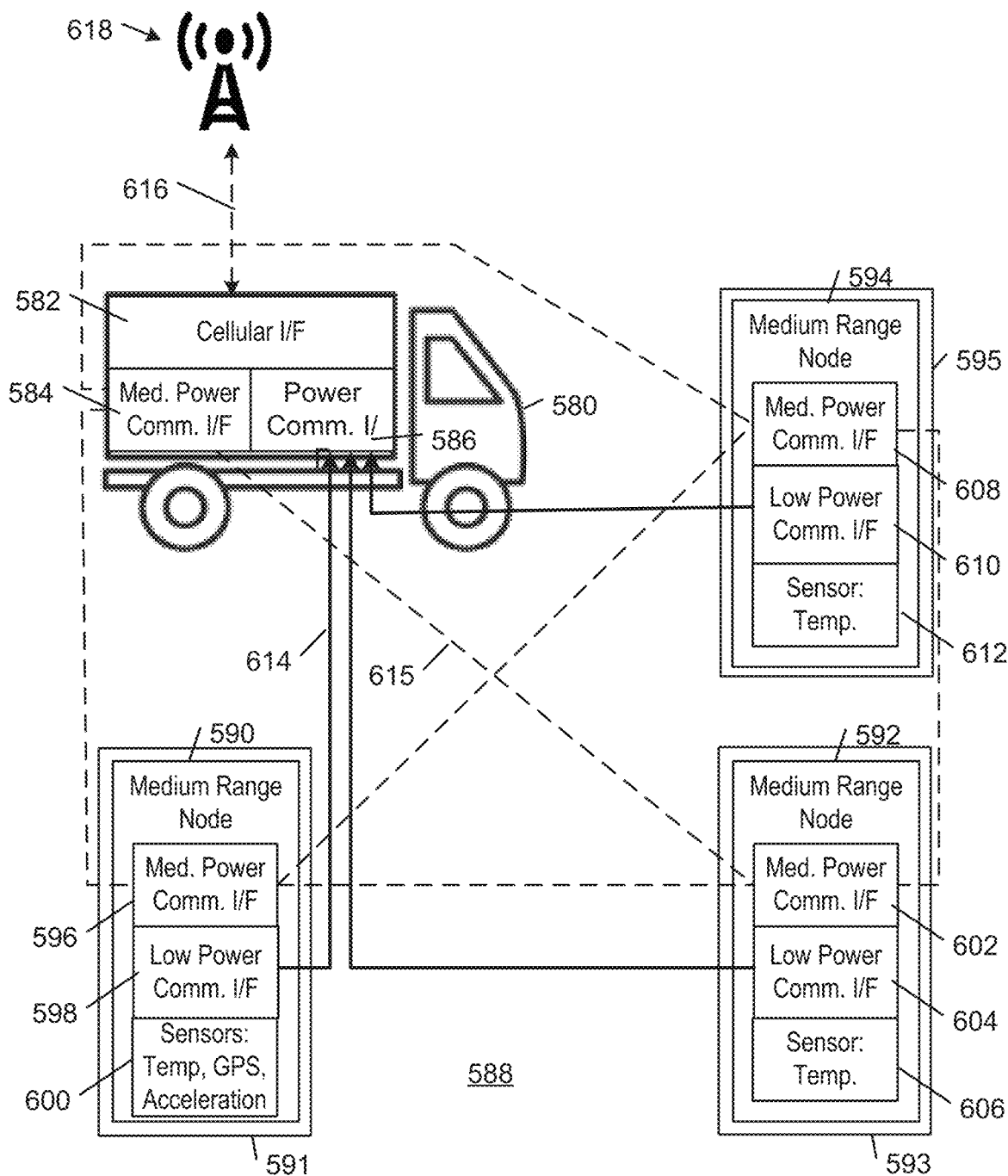

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 617), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
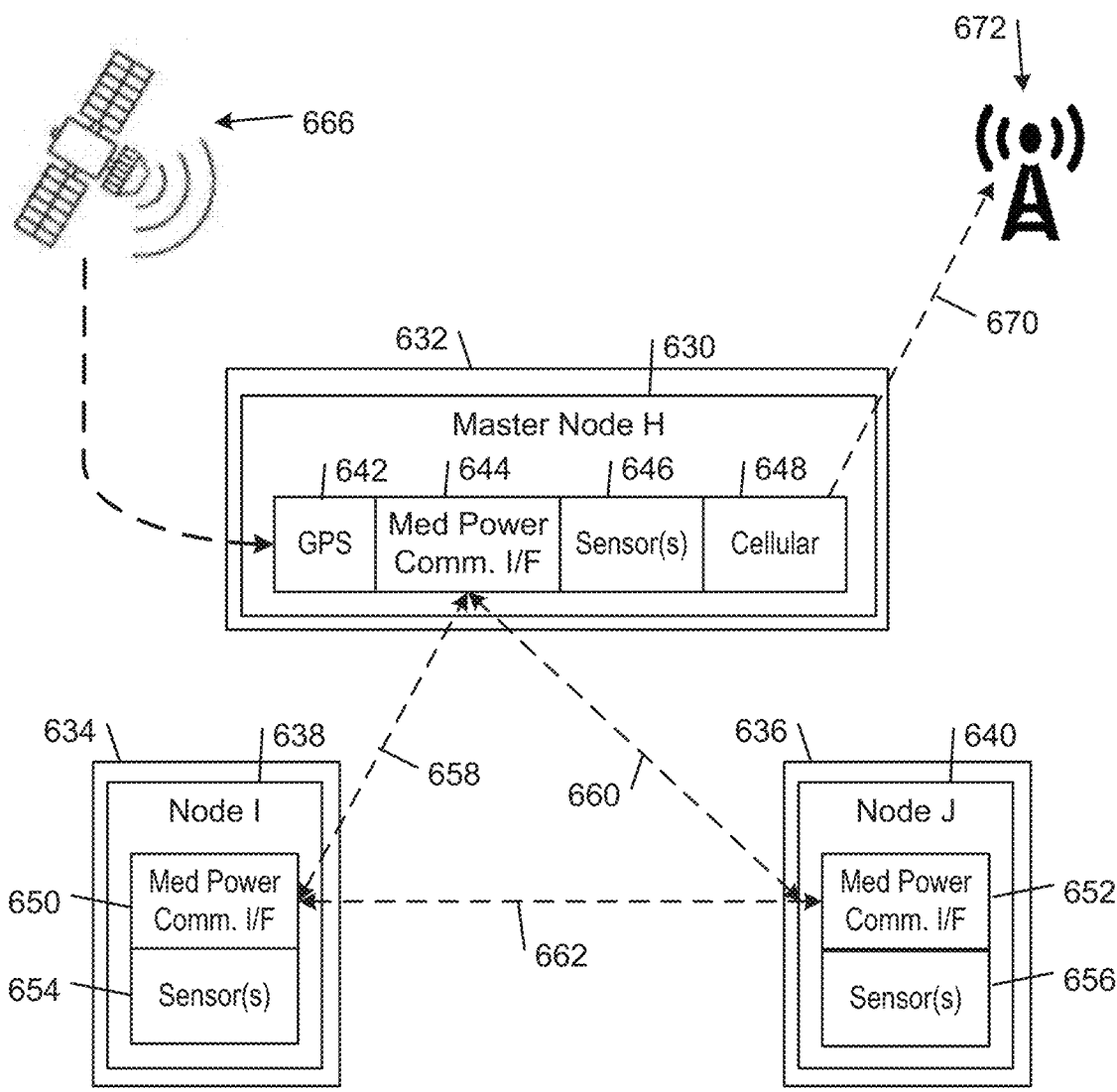

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Spreading Out Electronics

Disclosed herein is a wireless tracking device for tracking assets. In certain situations, tracking devices attached to assets may be exposed to physical damage or trauma. In particular, environments related to shipping, storing, industrial machinery, logistics, or other environments where asset tracking is useful, the assets being tracked may be handled roughly or interact with machinery that can damage parts of the asset or tracking devices that are attached to the assets.

Examples of physical damage may include the asset being dropped, a large item or object being dropped on top of the asset, a nail or other hardware (e.g., screw, bolt) penetrating the asset, machinery (e.g., a crane) impacting the asset during transport, strain from the asset holding a large amount of weight, exposure to heat, exposure to radiation, exposure to extreme cold, exposure to moisture, exposure to other weather conditions, and other forms of physical damage. In one example, the asset being tracked is a pallet for transporting and/or storing items. The pallet may include a wood material, a plastic material, a metal material (e.g., steel), some other material, or some combination thereof.

The disclosed wireless tracking device includes a printed circuit board (PCB) and/or other components that are resilient to physical damage. The PCB of the resilient tape node may be a flexible PCB. When referring to a "PCB" herein, a flexible PCB may be an included embodiment. In some embodiments, the wireless tracking devices is an embodiment of the adhesive tape platform described above with respect to FIGS. 1A-6C. The wireless tracking device (also referred to herein as a "resilient tape node") is a member of the wireless tracking system 400 described above, with respect to FIG. 7. The resilient tape node has an adhesive tape form factor, according to some embodiments, and is configured to be adhered to a portion of the asset being tracked. As mentioned above, when the resilient tape node is tracking the asset, the resilient tape node may be physically damaged. However, the resilient tape node is configured to continue functioning and performing asset tracking even after receiving significant physical damage and/or trauma.

One issue with conventional tracking devices is that if one or more of the conductive traces of a PCB of a conventional tracking devices is damaged, the tracking device may no longer be operational due to, for example, an open circuit caused by the damage. Another issue may be that a electronic component may malfunction due to physical damage or trauma. An example of an electronic component may include a microcontroller, a processor, a memory, an energy storage device, a sensor, communication system, some other electronic component, or some combination thereof.

In some embodiments, the resilient tape node includes redundant traces or sub-traces. If one or more redundant traces or sub-traces is damaged, one of the other redundant traces that isn't damaged may still provide a connection between two or more components on the PCB. In some embodiments, portions of the resilient tape node that are more likely to be exposed to physical damage include redundant traces or sub-traces, and other portions of the resilient tape node that are less likely to be exposed to physical damage do not include the redundant traces or sub-traces. The resilient tape node may also include redundant electronic components. According to some embodiments, the resilient tape node includes multiple copies of the same electronic component and corresponding traces. When one of the electronic components is damaged and malfunctioning, the resilient tape node deactivates the damaged component and switches to using one of the other copies of the component. Thus, the resilient tape node may receive significant physical damage or trauma and still continue to function.

Figure 11A:
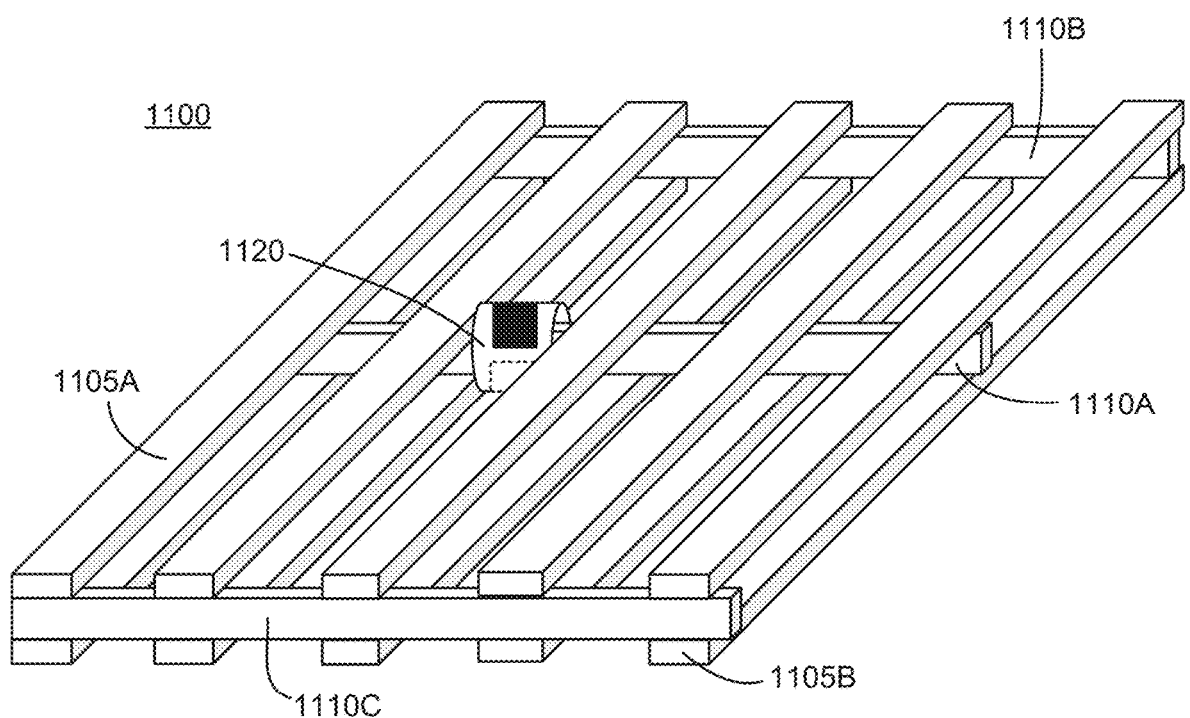
FIGS. 11A-11B show an example diagram of a pallet being tracked with a resilient wireless tracking device secured to the pallet, according to some embodiments.

FIG. 11A is a diagrammatic view of a pallet 1100 retrofitted with a tracking device 1120, in accordance with some embodiments. The tracking device 1120 is an embodiment of the adhesive tape platform 12, shown in FIGS. 1-6C, according to some embodiments. The tracking device 1120 may also be an embodiment of a wireless tracking belt. For example, the wireless tracking belt may be a belt that includes hook and loop fasteners, such that the belt may fasten to itself to secure the wireless tracking belt to an object that needs to be tracked. The wireless tracking belt may include the wireless transducing circuit 70, according to some embodiments. The pallet 1100 comprises top and bottom sets of deckboards 1105 and a set of support poles (also referred to as "stringers") 1110, including a center support pole 1110A and at least a support pole 1110B, 1110C at each side of the pallet. In some embodiments, the pallet 1100 may have additional or fewer deck boards 1105 and support poles 1110 than shown in FIG. 11A, and the deck boards and support poles may be oriented or shaped differently than shown in FIG. 11A. The pallet 1100 may include additional, different, or fewer components than shown in the diagram of FIG. 11A, such as blocks, notches, additional boards, and other components. For example, the pallet 1100 may be a plastic pallet wherein the deck boards 1105 are a single component, or the pallet may have smaller or larger gaps between the deck boards and/or the support poles 1110. The tracking device 1120 is looped around the center support pole 1110A (also referred to as the "center stringer") of the pallet 1100 and positioned such that electronic components of the tracking device are oriented outward along the tracking device, in some embodiments.

In some embodiments, nails, screws, bolts, or other hardware are used to secure the tracking device 1120 to the pallet 1100. This may result in punctures, tears, or other damage to the wireless tracking device 1120. In other embodiments, the tracking device 1120 is secured to the pallet 1100 using other means (e.g., with hook and loop fasteners on the tracking device 1120 or by an adhesive), but the tracking device 1120 still experiences damage. For example, nails or screws may be used to secure other objects to the pallet 1100 and incidentally damage the wireless tracking device, nails or screws may be used to repair a portion of the pallet 1100 and incidentally damage the wireless tracking device, or other damage may be inflicted to the wireless tracking device in the course of tracking the pallet 1100.

Figure 11B:
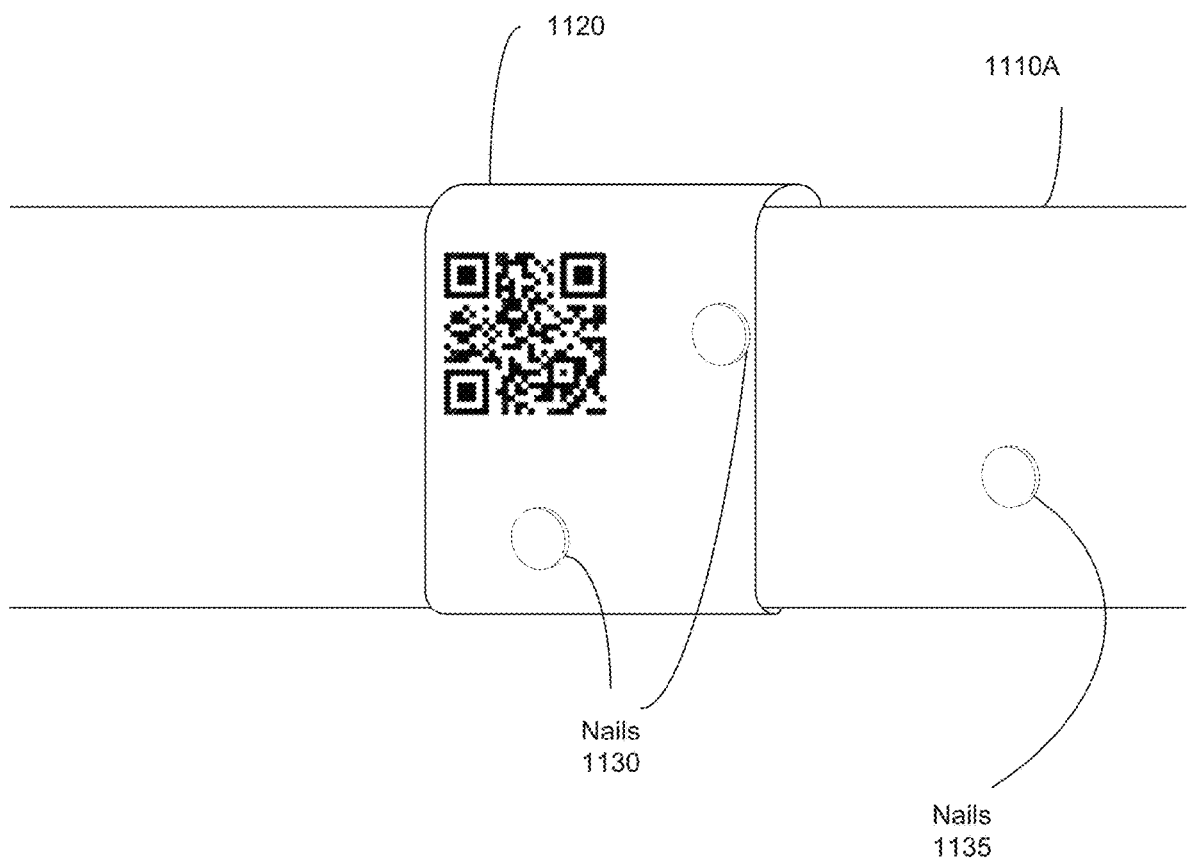

FIG. 11B shows a close-up view 1103 of the pallet 11100 where the wireless tracking device 1120 is secured to the pallet 1100 on the center support pole 1110. The wireless tracking device 1120 has experienced damage while tracking the pallet 1100, in the form of nails 1130 that have punctured the wireless tracking device 1120. The wireless tracking device 1120 is configured to be resilient to the physical damage or trauma and includes resilient circuit board traces that enable the wireless tracking device 1120 to continue functioning even when a conductive trace of a circuit in the wireless tracking device 1120 is damaged or broken. The resilient circuit board traces are discussed in further detail below with respect to FIGS. 12A-20.

Figure 12A:
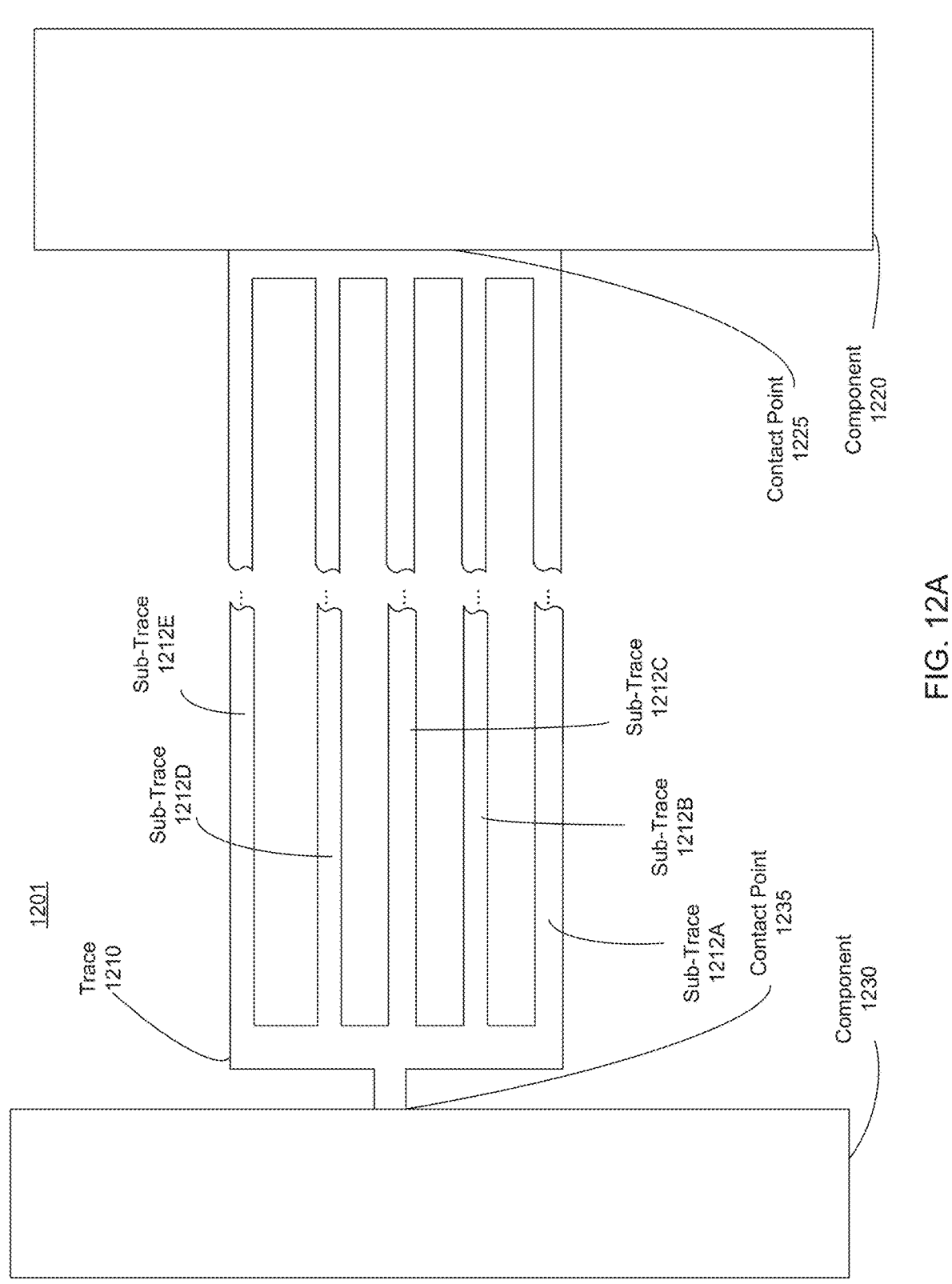
FIGS. 12A-12B are diagrams showing a portion of a printed circuit board including a trace between two components that includes a plurality of sub-traces, according to some embodiments.

FIG. 12A is a diagram showing a portion of a printed circuit board 1201 including a conductive trace 1210 between two components 1220, 1230 that includes a plurality of sub-traces 1212A, 1212B, 1212C, 1212D, according to some embodiments. The plurality of sub-traces 1212A, 1212B, 1212C, 1212D is collectively be referred to as the "sub-traces 1212," herein. The portion of the PCB 1201 is part of the resilient tape node, and in some embodiments, the portion of the PCB 1201 is a portion of a flexible PCB. The trace 1210 includes the redundant sub-traces 1212, such that if one of the sub-traces is broken or damaged during the tracking of an asset, the trace 1201 will still electrically connect the component 1220 to the component 1230. For example, if the tape node is penetrated by a nail during tracking of an asset (e.g., a pallet), the nail may break or otherwise damage one or more of the sub-traces 1212. As long as at least one of the sub-traces 1212 is not broken or damaged, the component 1220 and 1230 remain electrically connected to each other.

According to some embodiments, the trace 1210 may include portions that do not include the redundant sub-traces 1212. For example, the trace 1210 may include a portion that is a simple trace without the parallel redundant sub-traces. The portion may lead or be connected to a portion with the redundant sub-traces, as shown with the portion of the trace 1210 that is on the left side of FIG. 12 near the contact point 1235. In further embodiments, the portion of the trace 12120 that does not include the redundant sub-traces 1212 may be positioned in areas of the tape node that are less susceptible to physical damage than the areas of the tape node that include the portions of the trace 1210 including the redundant sub-traces 1212. Thus, the design and layout of the traces may be simplified in areas of the tape node where the PCB is exposed to less risk of physical damage.

Although only two components 1220, 1230 are shown being connected by the trace 1210 in FIG. 12A., the PCB and the trace 1210 are not limited thereto, and, in other embodiments, the trace 1210 may connect more than two components. Further, the PCB and the trace 1210 may include a different configuration and/or number of elements than shown in FIG. 12. For example, the trace 1210 may include a different number, shape, or size of sub-traces 1212.

The components 1220, 1230 are components of the wireless transducing circuit 70 shown in FIG. 3, according to some embodiments. The components 1220, 1230 may include an antenna, a communication circuit or system, an energy storage component (e.g., a battery), a memory, a processor, a microcontroller, an integrated circuit, an LED, a micro LED, a sensor (e.g., a photo sensor), a display, some other electronic component, or some combination thereof.

Figure 12B:
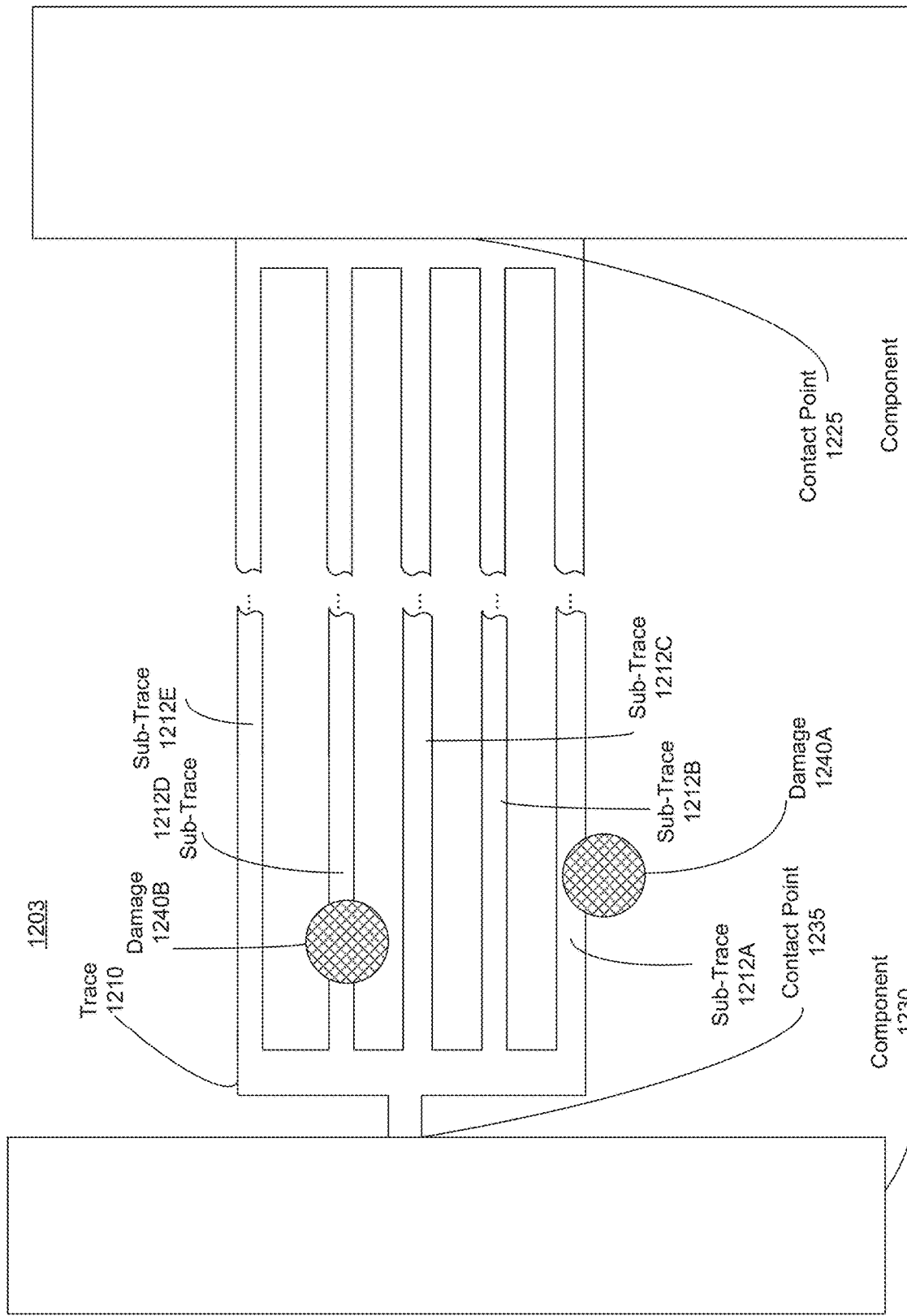

FIG. 12B is a diagram showing the portion of the PCB 1201 in a state 1203 after it has experienced physical damage 1240A, 1240B. For example, the PCB 1201 may have been punctured by one or more nails. Although the damage 1240A, 1240B overlaps the trace 1210, the connection between the contact points 1235, 1245 is not disrupted.

Figure 13A:
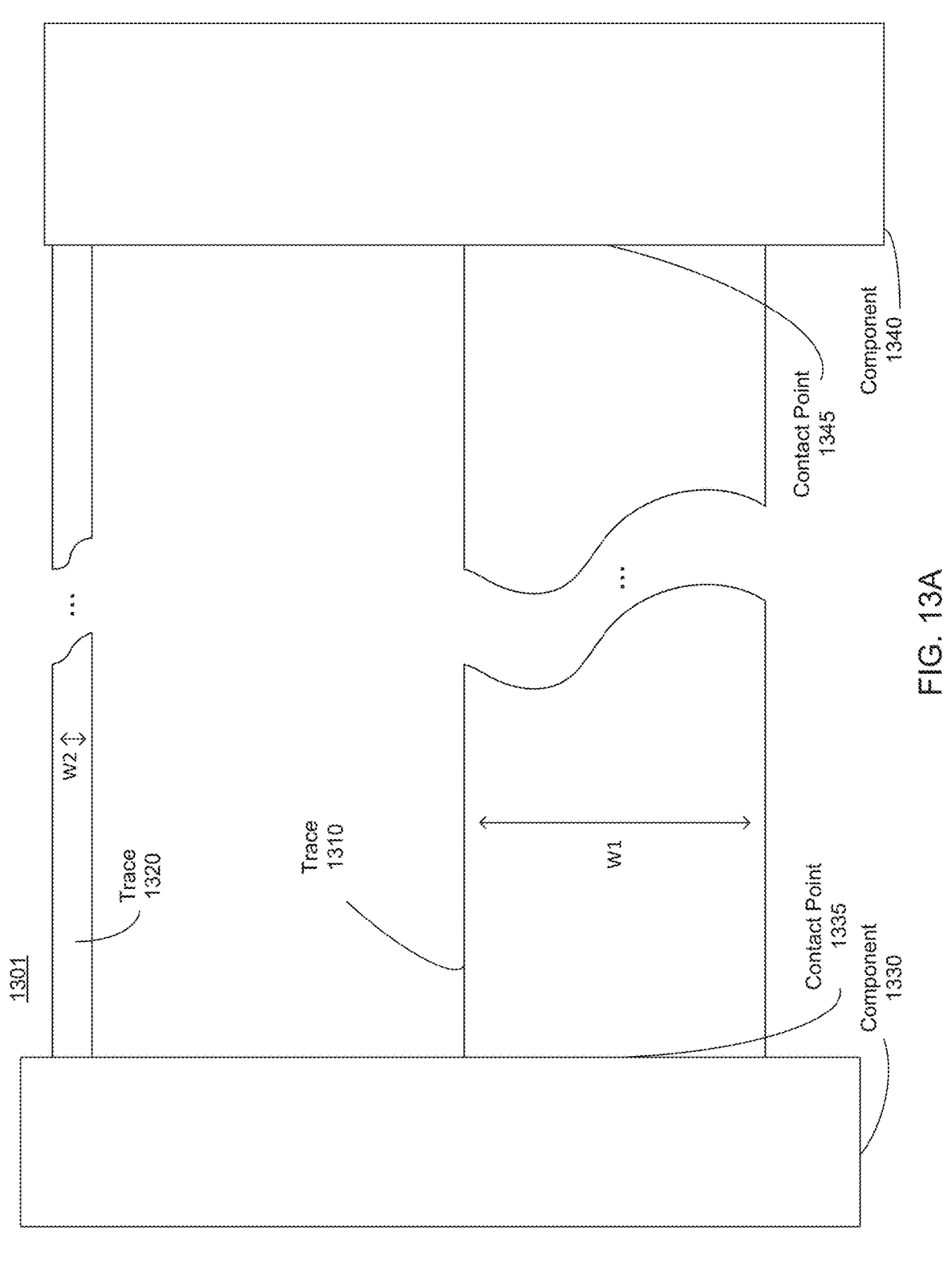
FIG. 13A-13B are diagrams showing a portion of a printed circuit board including a large size trace between two components that is configured to withstand physical damage, according to some embodiments.

FIG. 13A is a diagram showing a portion of a printed circuit board 1301 including a large size conductive trace 1310 between two components 1330, 1340 that is configured to withstand physical damage, according to some embodiments. The portion of the PCB 1301 is included in an embodiment of the resilient tape node. The large trace 1310 is configured to receive physical damage to a portion of the large trace 1310 and still electrically connect the component 1330 to the component 1340. For example if a nail or other hardware punctures or pierces the PCB at a region overlapping the large trace 1310, the large trace 1310 will not be completely severed, as long as the puncture hole has a diameter that is less than the width of the large trace 1310. In some embodiments, the large trace has a width W that is larger than a threshold width. For example, the large trace may have a width that is larger than 1 cm, according to some embodiments. In some embodiments, the width W1 corresponds to a type of physical damage risk that is associated with a task that the resilient tape node is assigned to. For example, if the resilient tape node is assigned to track a pallet that is likely to have one or more nails puncturing the resilient tape node, the width W1 may be greater than a threshold width that corresponds to a diameter of the nails used with the pallet.

FIG. 13A also shows a smaller trace 1320 that has a width W2 that is smaller than the width W1. The width W2 may correspond to a normal trace size comparable to a conventional PCB conductive trace. The smaller trace 1320 is positioned in an area of the tape node that have a lower risk of damage than an area where the large trace 1310 is positioned.

The components 1330, 1340 show in FIG. 13A are substantially similar to the components 1220, 1230 described above with respect to FIG. 12.

Figure 13B:
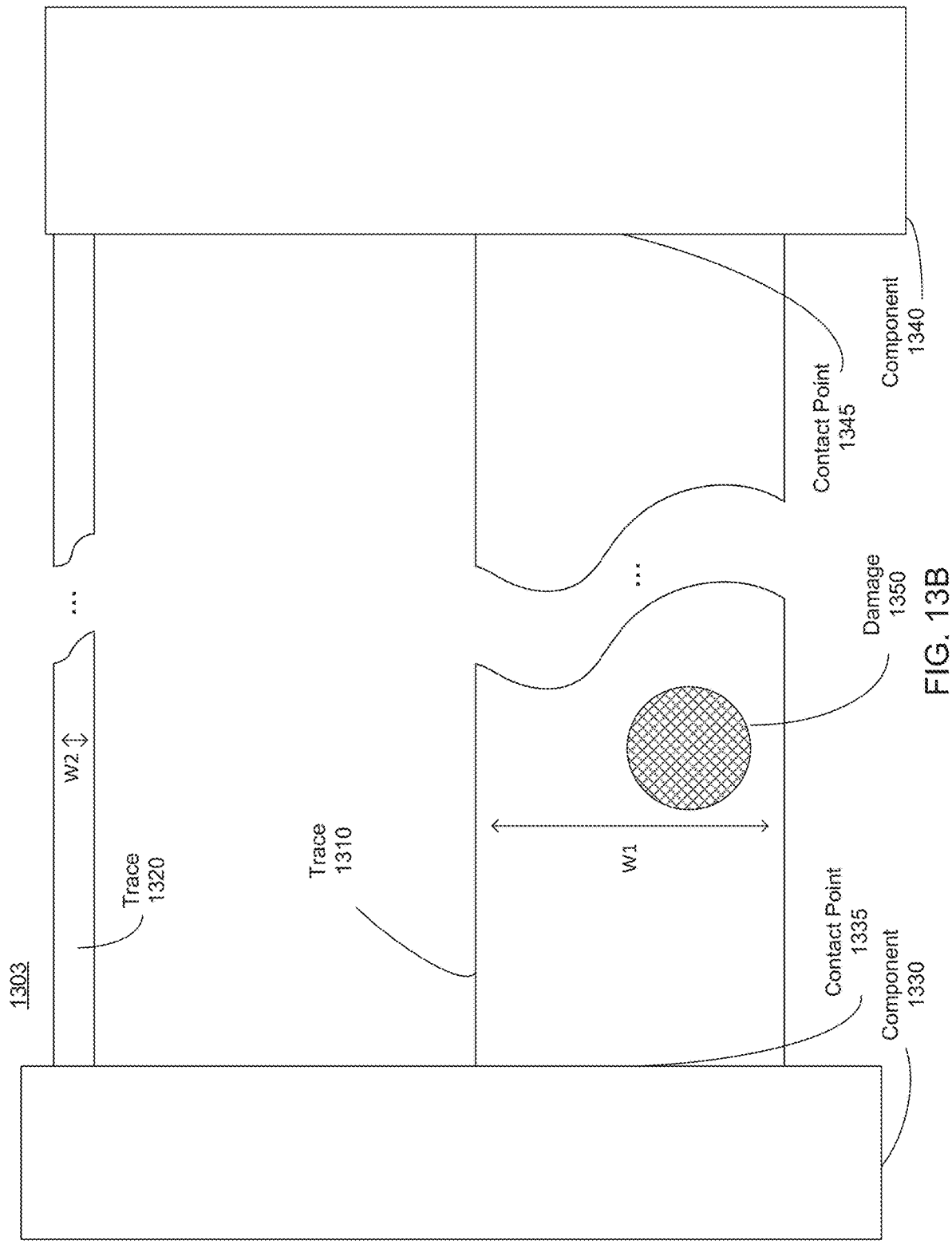

FIG. 13B is a diagram showing the portion of the PCB 1301 in a state 1303 after it has experienced physical damage 1350. For example, the PCB 1301 may have been punctured by a nail. Although the damage 1350 overlaps the trace 1310, the connection between the contact points 1335, 1345 is not disrupted.

Figure 14A:
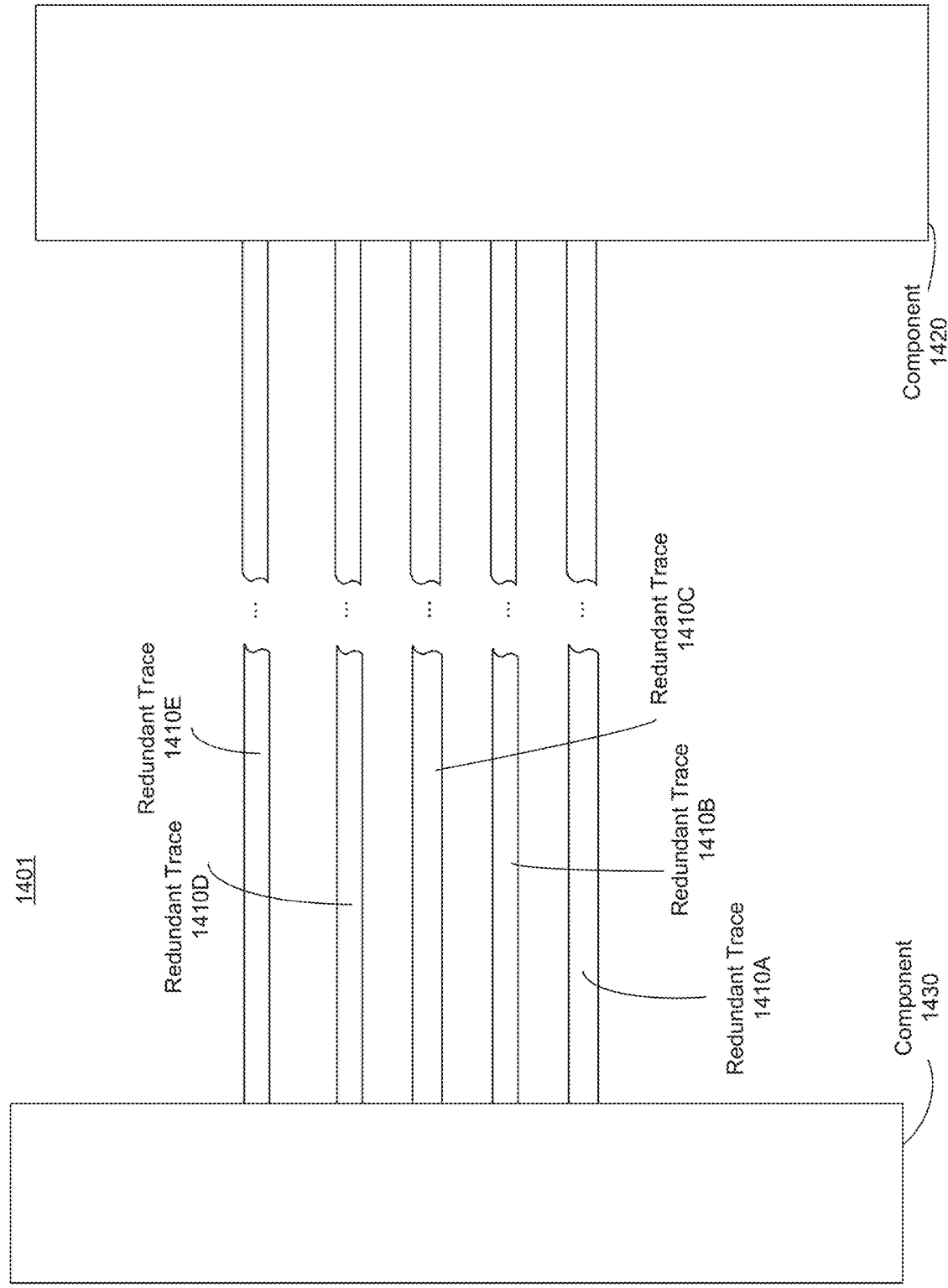
FIGS. 14A-14B are diagrams showing a portion of a printed circuit board including a plurality of redundant traces between two components, according to some embodiments.

FIG. 14A is a diagram showing a portion of a printed circuit board 1401 including a plurality of redundant traces 1410A, 1410B, 1410C, 1410D, 1410E connecting two components 1420, 1430, according to some embodiments. The plurality of redundant traces 1410A, 1410B, 1410C, 1410D, 1410E are collectively referred to as the "redundant traces 1410," herein. The redundant traces 1410 transmit the same electrical signals between the components 1420, 1430. If one of the redundant traces 1410 is broken or damaged, the connection between the components 1420, 1430 is preserved with the signal being carried by one of the other unbroken redundant traces 1410.

In some embodiments, the redundant traces 1410 all connect to the same contact or contact pad on the PCB, i.e. the redundant traces are connected in parallel at one or more points on the PCB. In other embodiments, one or more of the components 1420, 1430 includes redundant contacts or ports for receiving the signal carried by the redundant traces 1430. For example, if the component 1420 is an integrated circuit, each of the redundant traces 1430 may connect to a different redundant port, pin, or contact on the component 1420. Each redundant port on the component 1420 may be configured to receive the same signal. The redundant ports on the component 1420 may internally be connected in parallel, according to some embodiments. Other than embodiments where the components 1420, 1430 include redundant ports, pins, or contacts, the components 1420, 140 show in FIG. 14A are substantially similar to the components 1220, 1230 described above with respect to FIG. 12.

Figure 14B:
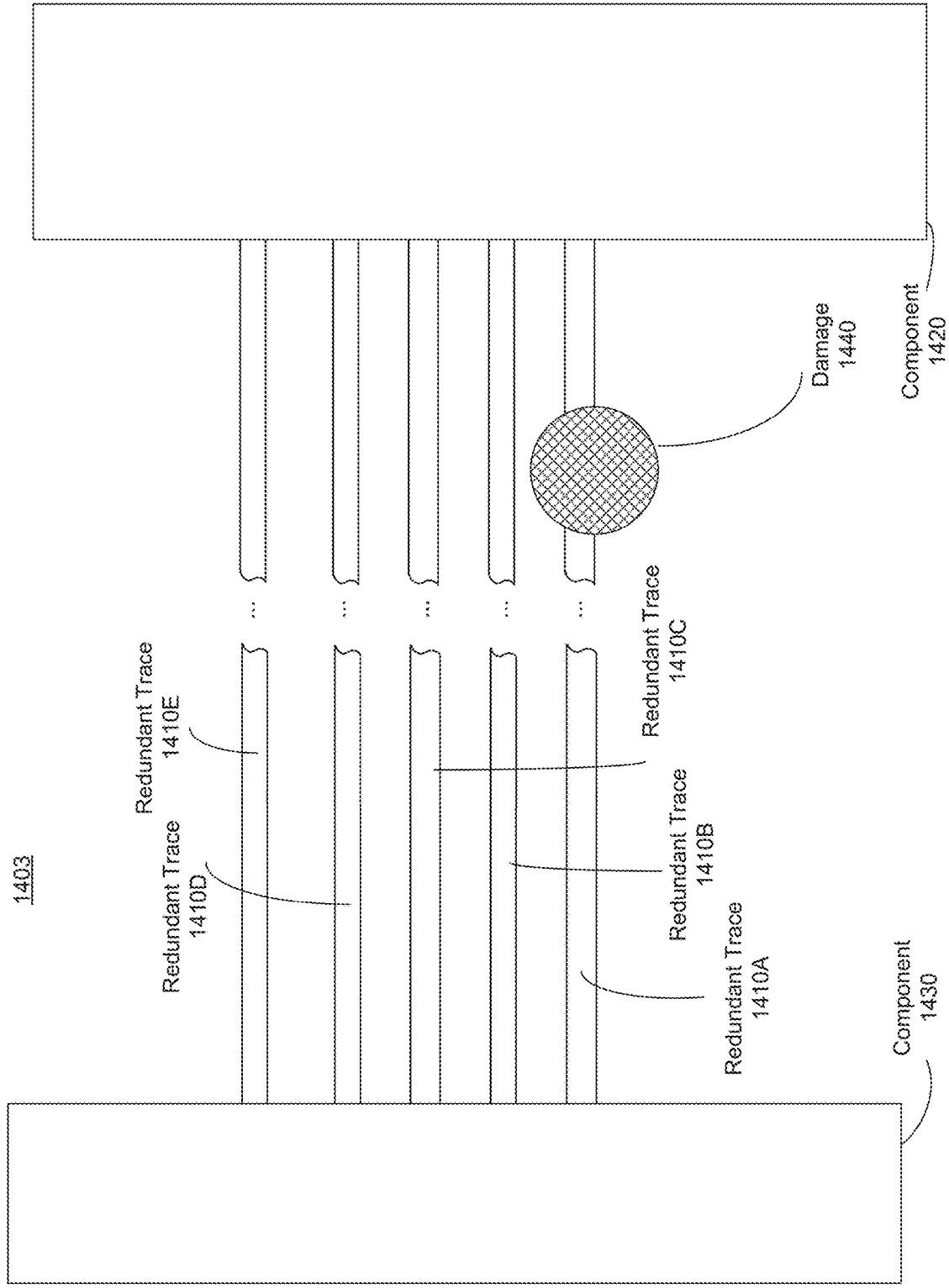

FIG. 14B is a diagram showing the portion of the PCB 1401 in a state 1403 after it has experienced physical damage 1440. For example, the PCB 1401 may have been punctured by a nail. Although the damage 1440 overlaps one of the redundant traces 1410A, the connection between the component 1420, 1430, is maintained by the other redundant traces 1410B-1410E.

In some embodiments, a resilient tape node includes a PCB with a percentage of metal in the PCB. The percentage of metal in the PCB may be adjusted based on an expected amount of damage that the resilient tape node will receive. In further embodiments, a resilient tape node's PCB includes a percentage of metal that is above a threshold percentage. In some embodiments, portions of the PCB exposed to physical damage may have different percentages of metal than other portions. In other embodiments, traces on the PCB include a plurality of metals. The percentages of each metal included in the traces may be similarly adjusted based on an expected amount of damage that the resilient tape node will receive. For example, a percentage of nickel included in the traces may be above a threshold percentage (e.g., 40%) based on the resilient tape node being exposed to physical damage. This may be done if one of the plurality of metals is more resilient against or less susceptible to breaking. In some embodiments, the percentages of each metal is different in a portion of the resilient tape node that is exposed to physical damage than other portions.

Detecting Damage to Conductive Traces

Figure 15:
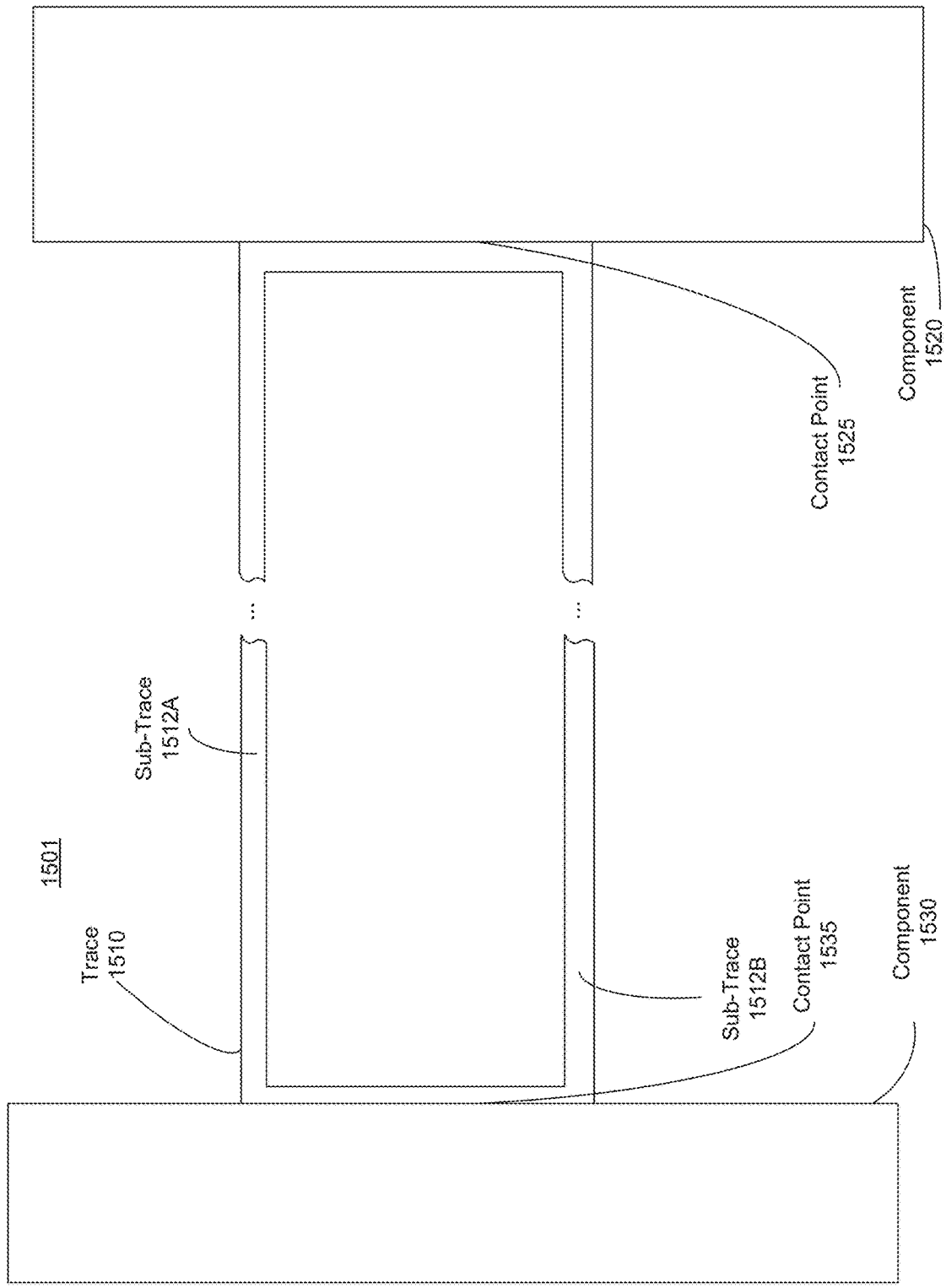
FIG. 15 is a diagram showing an example portion of a printed circuit board including a trace between two components that includes two sub-traces, according to some embodiments.

FIG. 15 is a diagram showing an example portion of a printed circuit board 1501 including a trace 1510 between two components 1520, 1530 that includes two sub-traces 1512A, 1512B, according to some embodiments. A resilient tape node includes the portion of the PCB 1501. The two sub-traces 1512A, 1512B may collectively be referred to as the "sub-traces 1512," herein. The portion of the PCB 1501 shown in FIG. 15 is an embodiment of the portion of the PCB 1201 shown in FIG. 12 that has only two sub-traces 1512. Although the portion of the PCB 1501 includes only two sub-traces 1512, the resilient tape node may include embodiments of the trace 1501 that includes a different number of sub-traces 1512 and is not limited thereto. The resilient tape node that includes the portion of the PCB 1501 is configured to detect when one of the sub-traces 1512 is damaged or broken.

Figure 16A:
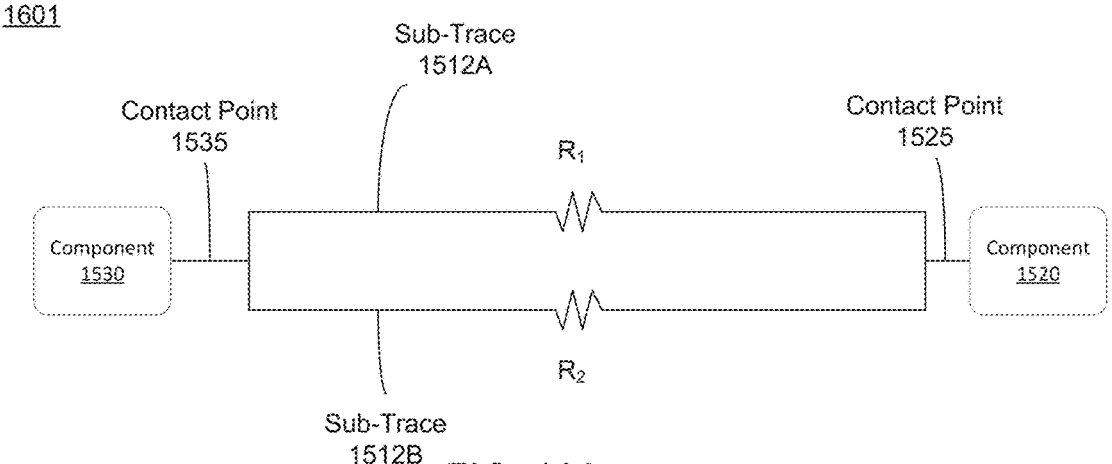
FIGS. 16A-16C are schematic diagrams corresponding to the example portion of the printed circuit board shown in FIG. 15, according to some embodiments.
Figure 16B:
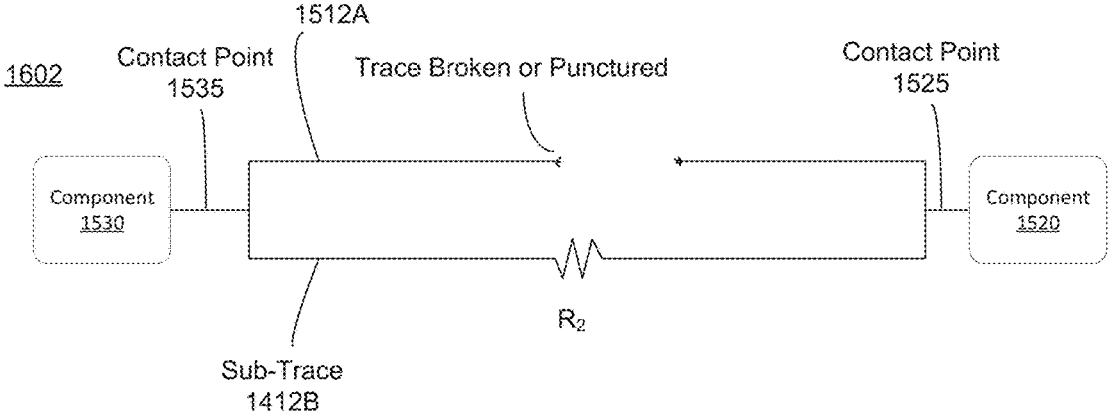
Figure 16C:
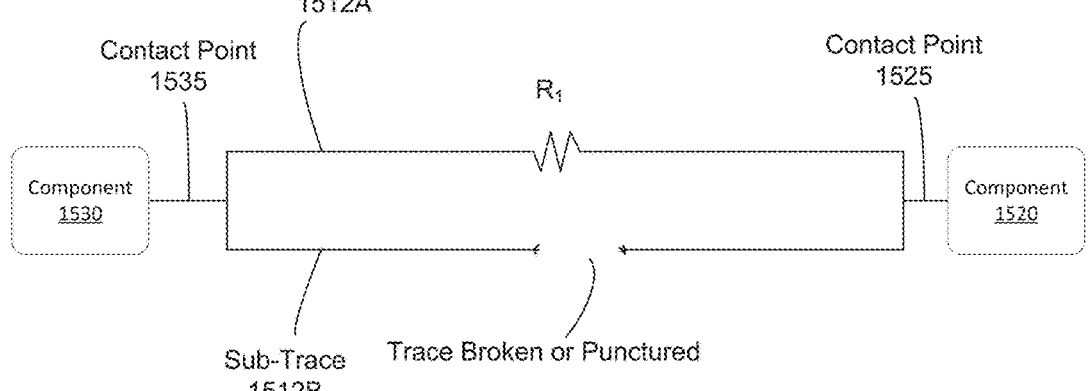

FIGS. 16A-16C are circuit diagrams corresponding to various states 1601, 1602, 1603 for the circuit included in the example portion of the printed circuit board 1501 shown in FIG. 15, according to some embodiments. FIG. 16 shows an undamaged state 1601 of the circuit. As shown in FIG. 15, the components 1520, 1530 are connected by the redundant sub-traces 1512. The trace 1510 connects to the component 1520 at the contact point 1525 and connects to the component 1530 at the contact point 1535. The sub-trace 1512A and the sub-trace 1512B are connected in parallel. The electrical resistance of the sub-trace 1512A is represented by R1. The electrical resistance of the sub-trace 1512B is represented by R2. In the undamaged state, the equivalent resistance between the contact points 1525, 1535 is $(R\_1 \cdot R\_2)/(R\_1+R\_2)$.

FIG. 16B shows a damaged state 1602 of the circuit where the sub-trace 1512A is broken or punctured at some portion of the sub-trace 1512A. The sub-trace 1512A is completely broken to the point that no electrical current can pass through the sub-trace 1512A. FIG. 16C shows an alternate damaged state 1603 of the circuit where the sub-trace 1512B is broken or punctured at some portion of the sub-trace 1512B. The sub-trace 1512B is completely broken to the point that no electrical current can pass through the sub-trace 1512B. In either damaged state 1602, 1603, the equivalent resistance between the contact points 1525, 1535 will increase compared to the undamaged state 1601. Thus, damage to the sub-traces 1512 can be detected by measuring the resistance or impedance between the contact points 1525, 1535.

In some embodiments, the circuit includes a resistance or impedance monitoring component connected to the contact points 1525, 1535 to detect damage to the traces. If the monitoring component detects a change (e.g., increase) in the resistance or impedance, the resilient tape node determines that at least one of the sub-traces 1512 has been damaged. In further embodiments, responsive to this, the resilient tape node transmits a notification to a member of the wireless tracking system 400 indicating that the resilient tape node has received physical damage. In other embodiments, the resistance or impedance between the contact points 1525, 1535 is measured by a human operator or inspection tool during an inspection, renovation, refurbishment, or repair process. In some embodiments, the tape node includes contact pads that are easily accessible from the exterior of the tape node for measuring the resistance or impedance of the trace 1510.

FIG. 16 is a flowchart showing a method 1600 of detecting damage to a conductive trace in a printed circuit board, according to some embodiments. At least two components of a resilient tape node are electrically connected 1610 on a PCB by a conductive trace that includes at least two redundant sub-traces connected in parallel. The trace is connected to each component at a respective contact point. The conductive trace may be, for example, an embodiment of the trace 1210 shown in FIG. 12 or an embodiment of the trace 1510 shown in FIG. 15. The initial resistance or impedance across the trace is measured 1620 at two contact points. The resistance or impedance may be measured by a component of the tape node or may be externally measured by a human operator or inspection tool, according to some embodiments. The initial resistance or impedance is stored 1630. In some embodiments, the initial resistance or impedance is stored on a memory of the resilient tape node. In other embodiments, the initial resistance or impedance is stored on a client device, another tape node, a server, a gateway node, some other member of the wireless tracking system 400, or some combination thereof. In some embodiments, the resilient tape node transmits the initial resistance or impedance to the wireless tracking system 400. In some embodiments, the human operator or inspection tool transmits the initial resistance or impedance (e.g., via a client device connected to the network).

The resilient tape node then operates, tracking 1640 one or more asset as described above. During its operation, the resilient tape node may be physically damaged in one way or another. For example, the tape node may receive physical trauma or force from another object. In other examples, a nail penetrates the tape node. After some period of use, a new resistance or impedance is measured 1650 across the trace at the two contact points. Similar methods for measuring the new resistance or impedance may be used with respect to the step 1620. In response to the new resistance or impedance being higher than the initial resistance by at least a threshold amount, it is determined 1660 that at least one of the redundant sub-traces has been damaged. In some embodiments, the resilient tape node locally determines that at least one of the redundant sub-traces has been damaged. In other embodiments, the resilient tape node transmits the impedance or resistance measurements to another member of the wireless tracking system 400 and another member of the wireless tracking system 400 performs the computation for determining 1660 that at least one of the sub-traces is damaged. In some embodiments, a human operator or inspection tool determines 1660 that at least one of the sub-traces is damaged.

Additionally, a user of the wireless tracking system 400 may be notified that at least one of the sub-traces is damaged. The wireless tracking system 400 may also track the condition of the PCB, the sub-traces, and/or the resilient tape node by logging the data (including the resistance or impedance measurements) on the condition in a database. In some embodiments, if it is determined that a threshold level of damage has occurred, the wireless tracking system 400 flags the resilient tape node for refurbishment or deactivation. For example, if it is determined that all but one of the sub-traces of the trace are damaged, the wireless tracking system 400 may flag the respective resilient tape node and notify a user of the wireless tracking system 400. This may be done to prevent the failure of the resilient tape node during a crucial tracking task.

Figure 18:
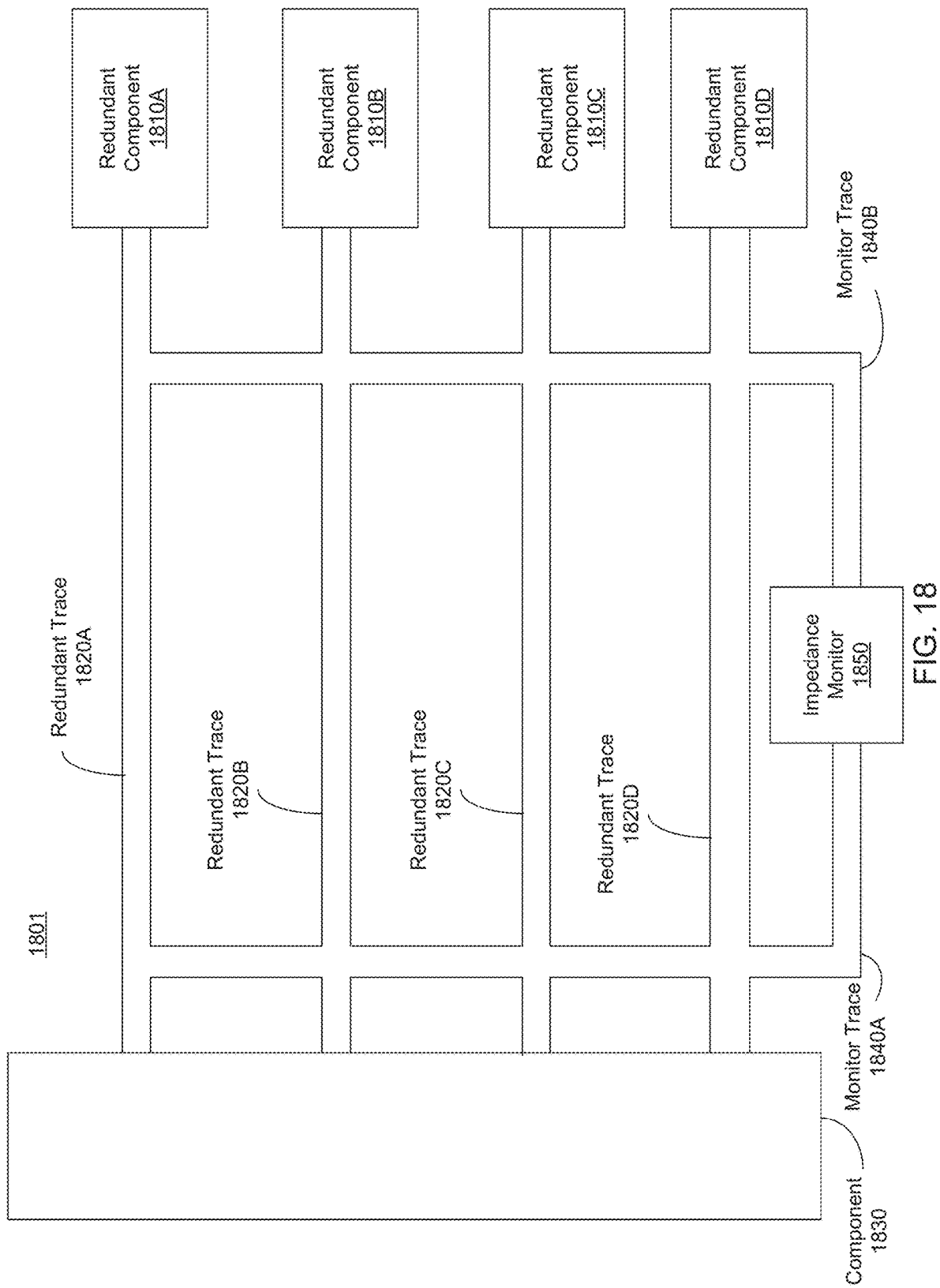
FIG. 18 is a diagram showing an example portion of a printed circuit board including a plurality of redundant components and a corresponding plurality of redundant traces, according to some embodiments.

FIG. 18 is a diagram showing an example portion of a printed circuit board 1201 including a plurality of redundant components 1810A, 1810B, 1810C, 1810D and a corresponding plurality of redundant traces 1820A, 1820B, 1820C, 1820D, according to some embodiments. The plurality of redundant components 1810A, 1810B, 1810C, 1810D are referred to herein as "the redundant components 1810." The plurality of redundant traces 1820A, 1820B, 1820C, 1820D are referred to herein as the "redundant traces 1820." The redundant traces connect each of the redundant components 1810 to the component 1830. In some embodiments, the component 1830 includes a respective redundant port, pin, or contact for receiving a signal from one of the redundant components 1810. In some embodiments, the redundant traces 1820 all connect to the same port, pin or contact of the component 1830. In some embodiments, the component 1830 includes a switch or multiplexer for selecting one of the redundant traces 1820.

According to some embodiments, the resilient tape node only uses one of the redundant components 1810 at a time. For example, only one of the redundant components 1810 may be used to minimize power consumption of the circuit. When it is determined that one of the redundant traces 1820 is damaged or broken, the resilient tape node may switch to using another one of the redundant components 1810., according to some embodiments. For example, a resilient tape node may initially use the redundant component 1810A. If it is determined that the redundant trace 1820A is damaged or broken, the resilient tape node may switch to using the redundant component 1810B. In some embodiments, the redundant components 1810 include internal switches for activating or deactivating themselves. In other embodiments, the circuit includes switches for connecting or disconnecting each of the redundant components 1810.

The monitor traces 1840A, 1840B connect the redundant traces 1820 to the impedance monitor 1850. The impedance monitor is a component configured to measure the equivalent resistance or impedance across the redundant traces, according to some embodiments in order to determine if one or more of the redundant traces 1820 is damaged or broken. Although the impedance monitor 1850 is shown in FIGS. 18 and 19 to be connected to each of the redundant traces 1820 in parallel, in other embodiments the impedance monitor 1850 may have a separate pair of monitor traces for each one of the redundant traces 1820 to individually measure the resistance or impedance of the one of the redundant traces 1820. Based on a change of the resistance or impedance measurements (e.g., using the method described in FIG. 16) of the redundant traces 1820, it may be determined that one or more of the redundant traces 1820 has been damaged or broken. In some embodiments, each of the redundant traces 1820 may be designed with a corresponding resistance or impedance. One or more of the corresponding resistance or impedances may be different from each other. In further embodiments, it is determined which of the redundant traces 1820 has been damaged or broken based on a change of the resistance or impedance. For example, if the resistance or impedance of the redundant traces 1820 changes by a first amount (within a threshold of error), it is determined that the first redundant trace 1820A has been damaged or broken. If the resistance or impedance changes by a second amount (within a threshold of error), it is determined that the second redundant trace 1820A has been damaged or broken.

Figure 19A:
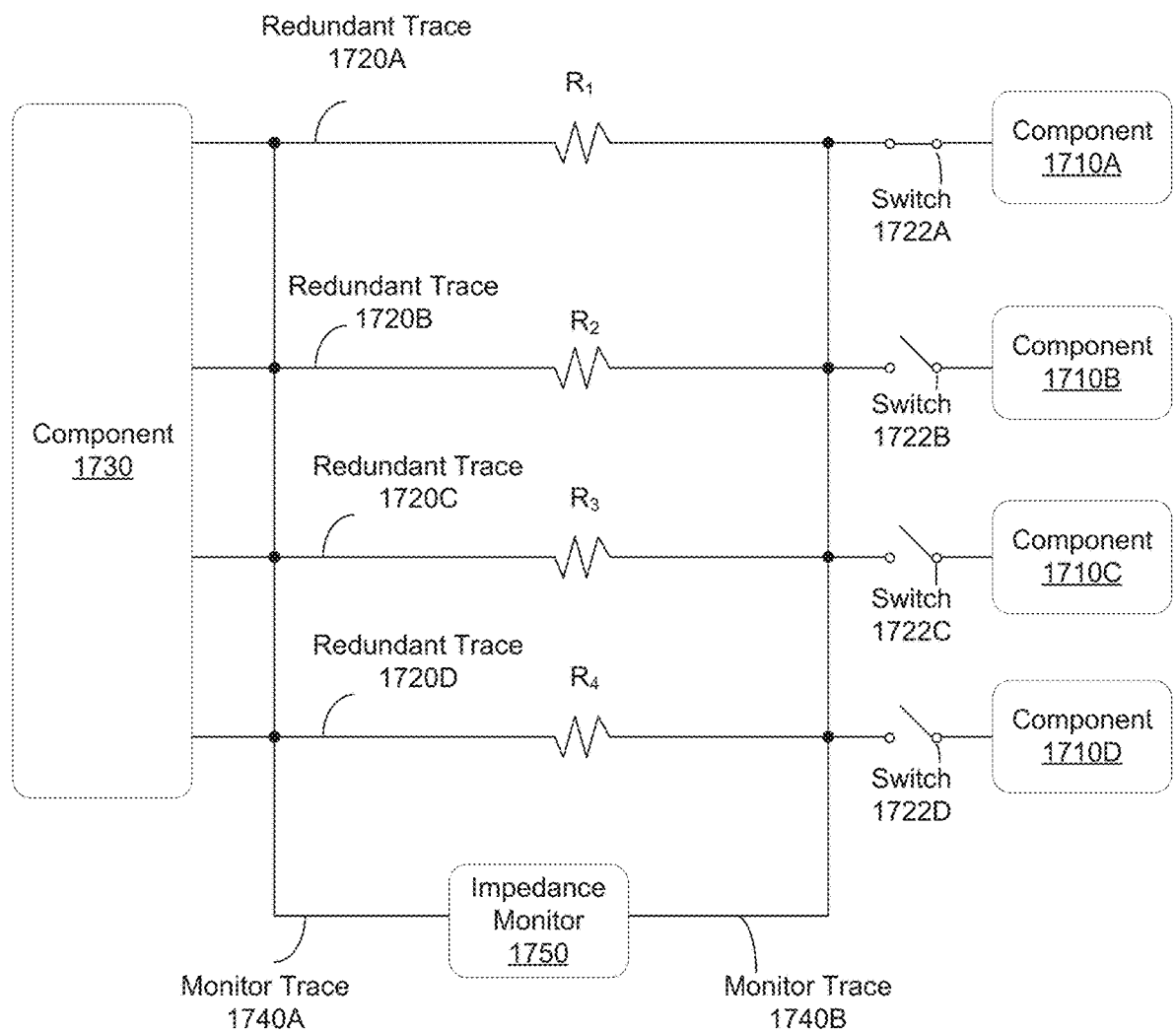
FIGS. 19A-19C are schematic diagrams corresponding to the example portion of the printed circuit board shown in FIG. 18, according to some embodiments.
Figure 19B:
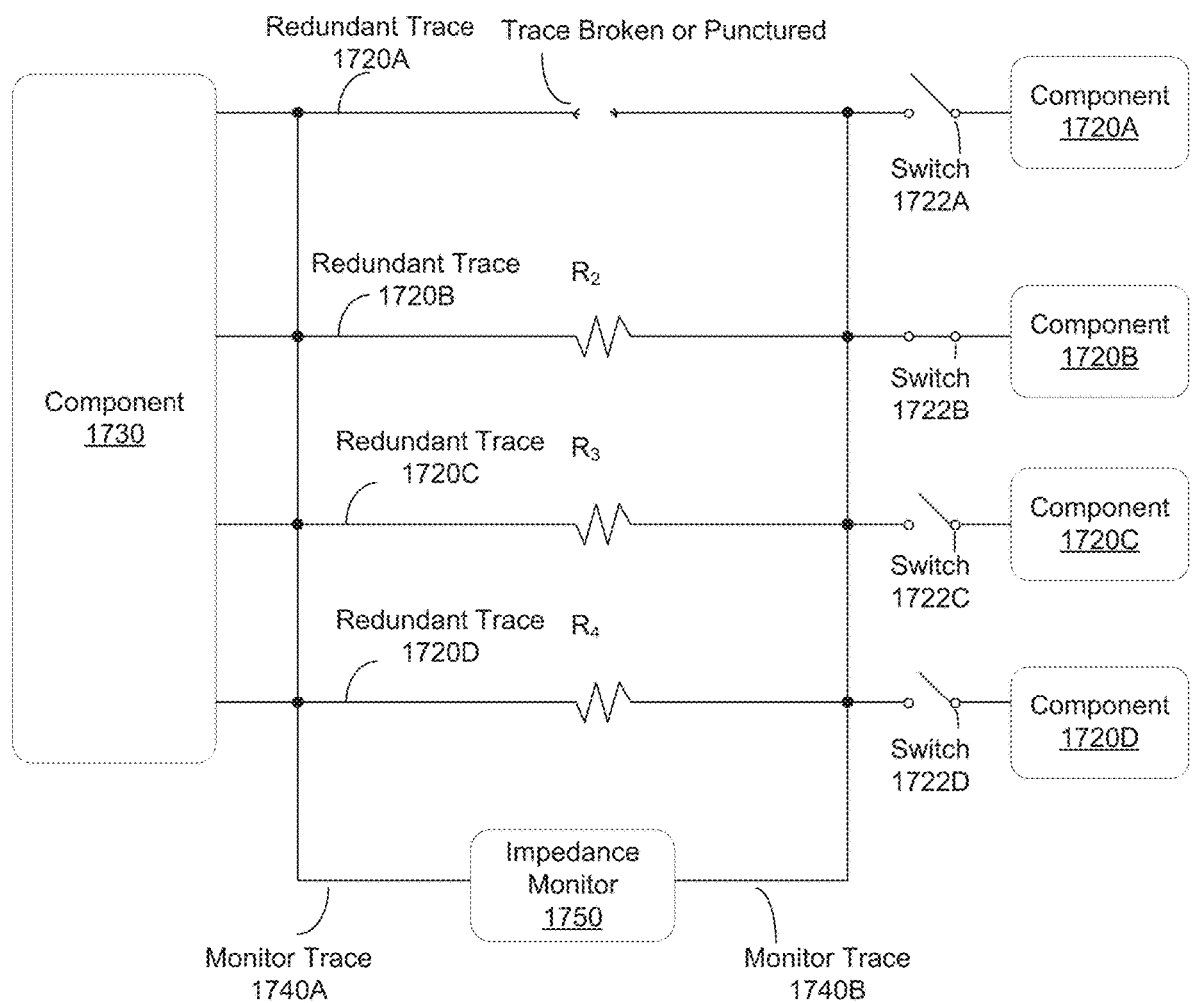

FIGS. 19A-19B are schematic diagrams corresponding to the example portion of the printed circuit board 1801 shown in FIG. 18, according to some embodiments. FIG. 19A shows an undamaged state 1901 of the circuit included in the portion of the PCB 1801. In the example shown in FIG. 19A, the redundant component 1810A is being used; however, in other cases, another one of the redundant components (e.g., redundant component 1810D) may be used. The circuit may switch between the redundant components 1810 using the switches 1822A, 1822B, 1822C, 1822D (collectively, "switches 1822"), according to some embodiments. In other embodiments, the switches 1822 are each internal to one of the redundant components 1810. In other embodiments, other methods are used to switch between the redundant components 1810.

FIG. 19B shows a damaged state 1902 of the circuit where the redundant trace 1820A has been broken. The impedance monitor 1850 detects that the redundant trace 1820A a change in the impedance or resistance corresponding to the broken redundant trace 1820A. In response, the resilient tape node switches to using redundant component 1820B. Although the example of FIG. 19B shows that the circuit has switched to using redundant component 1820B, in other examples, the circuit switches to another one of the redundant components 1820C, 1820D. In some embodiments, the redundant traces 1820 are not connected in parallel and each of the redundant traces 1820 is individually connected to the impedance monitor 1850 by a separate pair of monitor traces. In other embodiments, the resilient tape node switches which of the redundant components 1820 it uses based on detecting damage to one of the redundant components. For example, if the component 1820A is outputting an electrical signal that is unexpected or corresponds to a malfunction, the resilient tape node may switch to using the component 1820B, in response.

In the example of FIGS. 19A and 19B the monitoring trace is connected in parallel to each of the traces 1720A-1720D. However, in other embodiments, the redundant traces (and as a result the components 1720A-1720D) are not connected in parallel. The impedance monitor may be separately connected to each of the redundant traces 1720A-1720D via independent traces. In further embodiments, the circuit 1901 includes a separate impedance monitor 1750 component connected to each of the redundant traces 1720A-1720D. The wireless tracking device switches between which component 1720A-1720D to activate and use based on a status (broken, damaged, or undamaged) of the redundant traces 1720A-1720D.

Figure 19C:
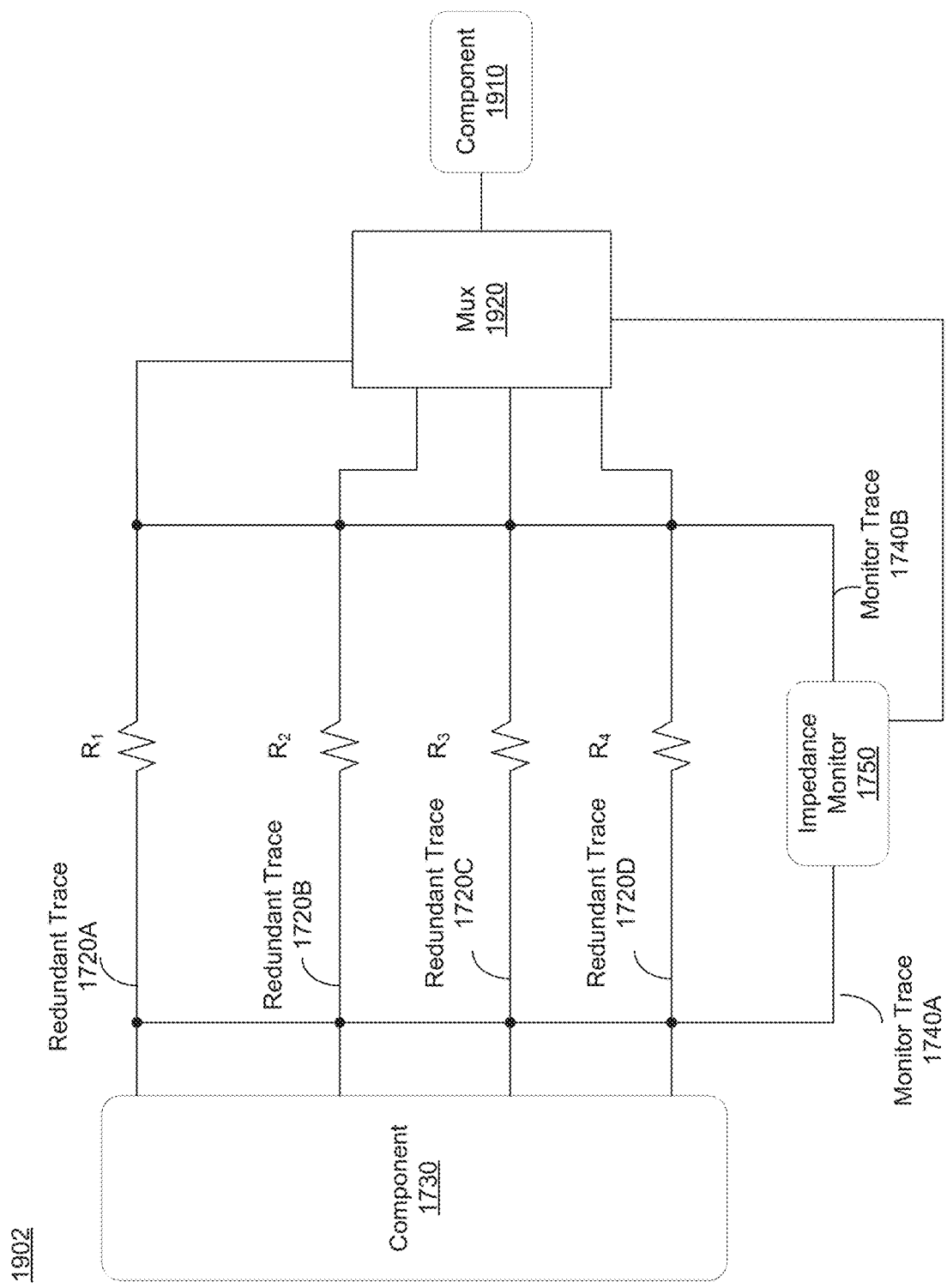

FIG. 19C shows an alternate embodiment 1903 of the circuit 1901 that includes a multiplexer 1920 in place of the switches 1722A-1722CD. In the example shown in FIG. 19C, the circuit 1903 does not include the redundant components 1720B-1720C, but includes a single component 1920 that performs the functions of component 1720A. The redundant traces 1720A-1720D are connected to the inputs of the multiplexer 1930 and an output of the multiplexer 1930 is connected to the component 1920, with the multiplexer 1930 configured to switch between the redundant traces based on detecting one or more of the redundant traces is broken or damaged. In other embodiments, the multiplexer may be connected to the multiple components 1720A-1720D, as with the circuit 1901 of FIG. 19A.

FIG. 20 is a flowchart showing a method of switching between redundant components of a circuit, according to some embodiments. The circuit is included in a resilient tape node. The circuit includes a plurality of redundant components including a first redundant component. The first redundant component is activated 2010 and used in the circuit. In some embodiments, the other redundant components which are functionally similar or are configured to perform the same functions as the first redundant component are deactivated. The circuit also includes a plurality of redundant traces connecting the redundant components to other parts of the circuit. The redundant traces include a first redundant trace connected to the first redundant component. The initial resistance or impedance across the redundant traces is measured 2020 and stored 2030.

Figure 21:
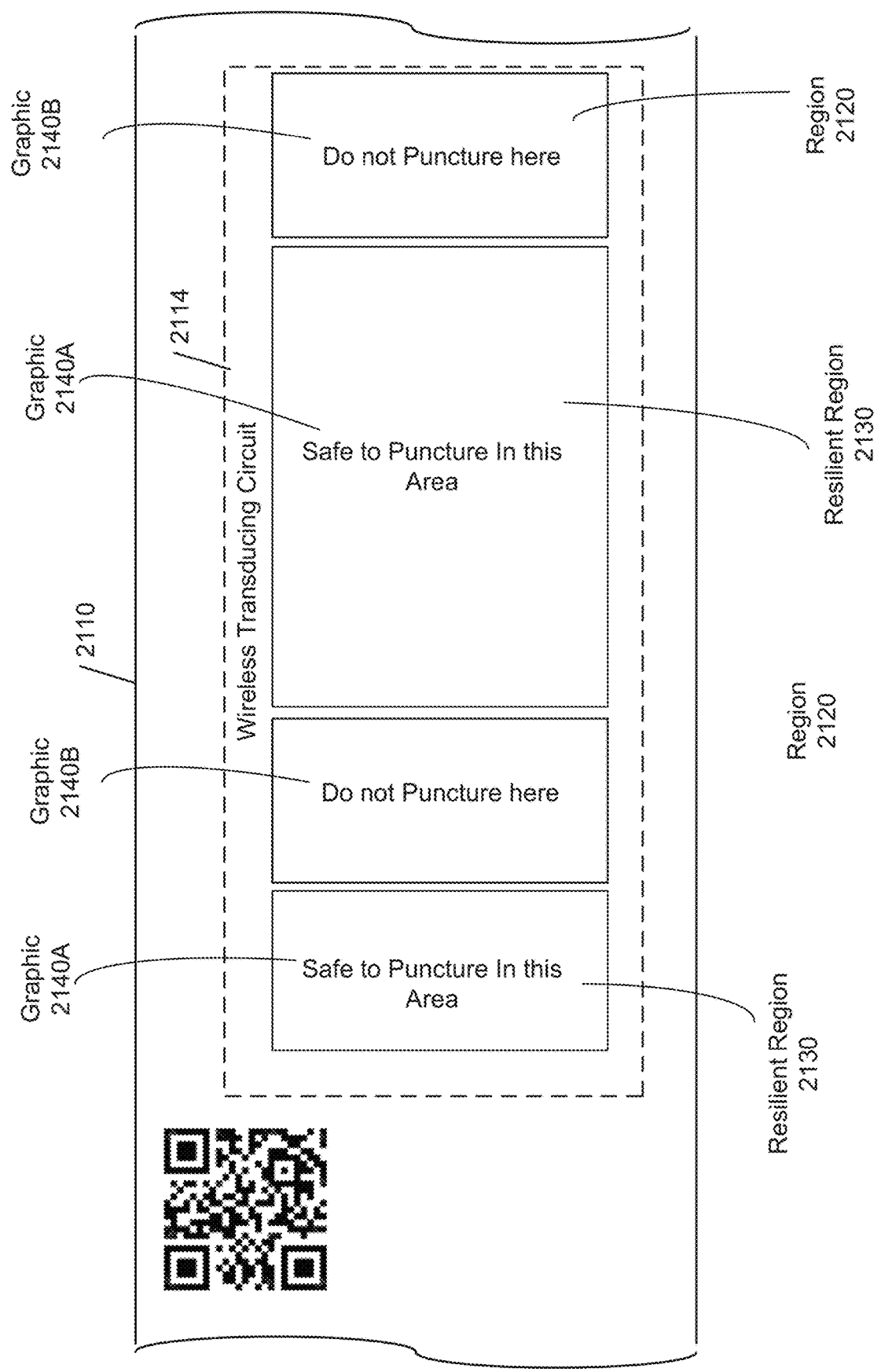
FIG. 21 is an alternate embodiment of a resilient wireless tracking device that includes a region resilient to physical damage, according to some embodiments.

The resilient tape node is then used to track 2040 an asset, as described above. During the asset tracking, the resilient tape node may receive physical damage. After some period of use, a new resistance or impedance is measured 2050 across the redundant traces. Responsive to the new resistance or impedance being different (e.g., higher) from the initial resistance or impedance by a first amount, it is determined 2060 that the first redundant trace has been damaged. Responsive to the determining 2060, the resilient tape node deactivates 2070 the first redundant component and activates a second redundant component of the plurality of redundant components. Thus, the resilient tape node does not lose the functionality of the first redundant component even when the resilient tape node is damaged FIG. 21 is an alternate embodiment of a resilient wireless tracking device 2110 that includes a region resilient to physical damage, according to some embodiments. The resilient wireless tracking device 2110 is an embodiment of the adhesive tape platform, according to some embodiments. In other embodiments, the resilient wireless tracking device

2110 is a wireless tracking belt, such as the one discussed above with respect to FIGS. 11A-11B.

The resilient wireless tracking device 2110 includes a wireless transducing circuit 2114 which is an embodiment of the wireless transducing circuit 70. The wireless transducing circuit 2114 overlaps one or more regions 2120 and one or more resilient regions 2130. The portions of the wireless transducing circuit 2114 that overlaps the resilient regions 2130 include embodiments of the resilient conductive traces and circuits discussed above, such as, for example, the ones shown in FIGS. 12A-16C and 18-19C. The portions of the wireless transducing circuit 2114 that overlaps the one or more regions 2120 may include components and circuit elements that are not resilient to physical damage, in some embodiments. The wireless tracking device 2110 is configured to be positioned on an asset, such that the resilient regions 2130 are exposed to physical damage or trauma. For example, the wireless tracking device 2110 may be installed on an asset in a position where the resilient regions 2130 overlap a portion of the asset where hardware (e.g., nails, screws, bolts) is installed or punctures the asset. The one or more regions 2120 may be positioned at a position that protects the regions 2120 from physical damage or trauma.

On an external surface of the wireless tracking device 2110, for example, on the cover layer or substrate, one or more graphics 2140A, 2140B. The one or more graphics 2140A, 2140B may include images and/or text. The one or more graphics 2140A, 2140B may be printed directly on the wireless tracking device 2110 or may be printed on labels that are applied to the wireless tracking device 2110, according to some embodiments. The graphics 2140A indicate to a user that the resilient region 2130 is resilient to physical damage. In the example of FIG. 21, the graphic 2140A includes text that indicates that a user may puncture the wireless tracking device 2110 in the resilient regions 2130, without causing malfunction to the wireless tracking device 2110. Similarly, the graphic 2140B includes text that indicates that the user should not puncture the wireless tracking device 2110 in the regions 2120. In other embodiments, different type of or a different number of graphics may be displayed on the wireless tracking device 2110.

Computer Apparatus

Figure 22:
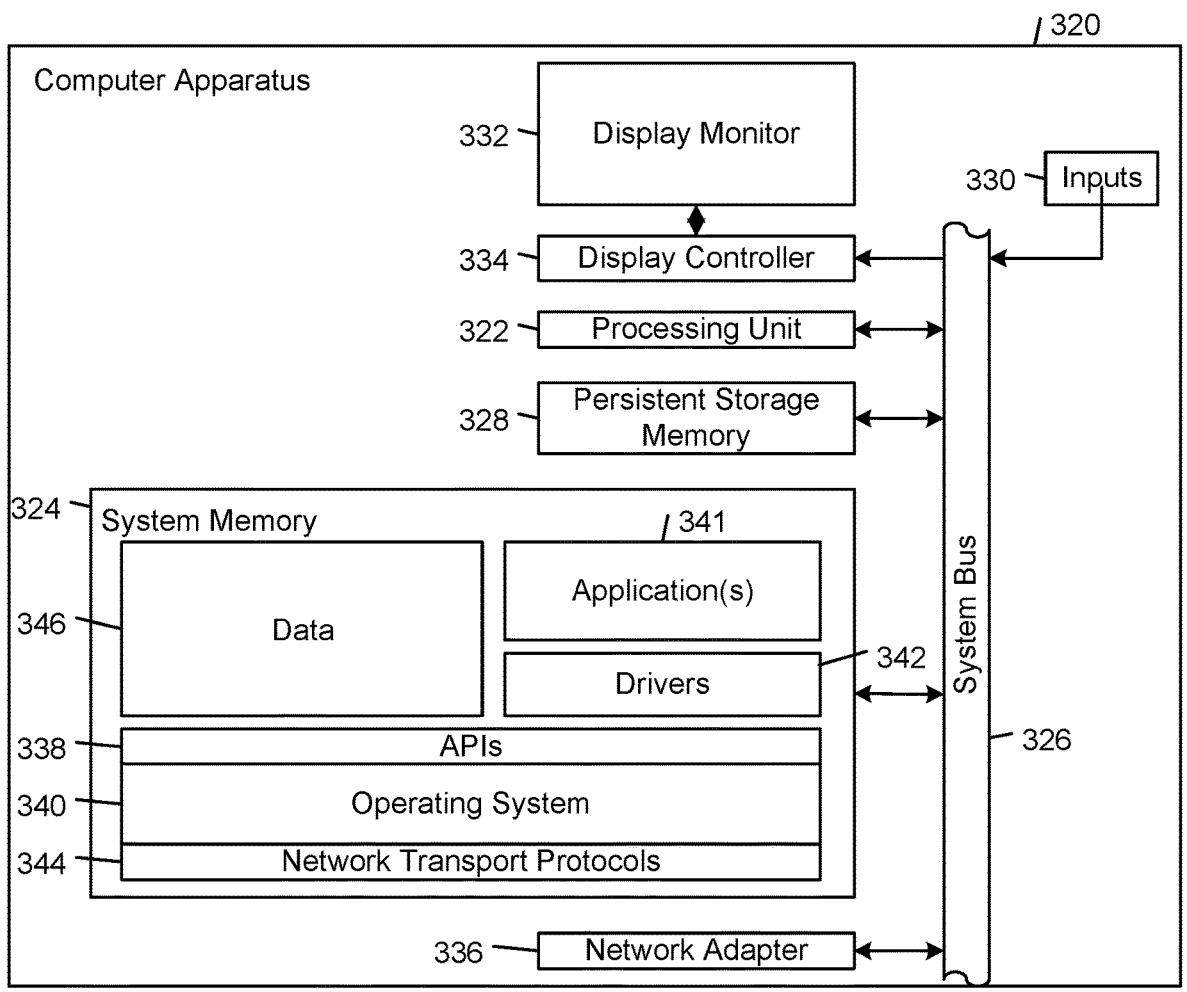
FIG. 22 shows an example embodiment of computer apparatus, according to some embodiments.

FIG. 22 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A resilient flexible adhesive tape platform comprising:
   a flexible substrate;
   a flexible cover layer on the flexible substrate;
   a device layer in between the flexible substrate and the flexible cover layer comprising components connected to a resilient printed circuit board; and
   the resilient printed circuit board (PCB) in between the flexible substrate and the flexible cover layer, flexible printed circuit board comprising:
   a resilient conductive trace on the PCB connecting two of the components, the resilient conductive trace comprising a plurality of sub-traces, each of the plurality of sub-traces electrically redundantly connecting the two electronic components to each other;
   wherein the resilient flexible adhesive tape platform is configured to be punctured in a region overlapping the resilient conductive trace without a malfunctioning of the resilient flexible adhesive tape platform.

2. The resilient flexible adhesive tape platform of claim 1, wherein if one of the plurality of sub-traces is damaged or broken, other sub-traces of the plurality of sub-traces electrically still connects the two electronic components to each other.

3. The resilient flexible adhesive tape platform of claim 1, wherein the resilient flexible adhesive tape platform is configured to be attached to an asset and track the asset.

4. The resilient flexible adhesive tape platform of claim 1, wherein the resilient PCB is a flexible PCB.

5. A resilient tape node comprising:
   a printed circuit board (PCB);
   at least two electronic components on the PCB; and
   at least one conductive trace on the PCB, the conductive trace comprising:
   a plurality of sub-traces, each of the plurality of sub-traces electrically connecting the at least two electronic components to each other;
   wherein the resilient tape node is configured to be punctured in a region overlapping the at least one conductive trace without a malfunctioning of the resilient tape node.

6. The resilient tape node of claim 5, wherein the resilient tape node is configured to detect damage to one of the plurality of sub-traces based on measuring a change of electrical impedance across the one of the plurality of sub-traces.

7. The resilient tape node of claim 6, further comprising:
   a first wireless communication interface;
   a processor;
   a memory; and
   a battery.

8. The resilient tape node of claim 7, wherein the resilient tape node wirelessly transmits a notification to another wireless communication device using the first wireless communication interface when the resilient tape node detects damage to one of the plurality of sub-traces.

9. The resilient tape node of claim 5, wherein the plurality of sub-traces are connected in parallel.

10. The resilient tape node of claim 9, wherein a first sub-trace of the plurality of sub-traces has a first resistance or impedance, and a second sub-trace of the plurality of sub-traces has a second resistance or impedance.

11. The resilient tape node of claim 10, further comprising an impedance monitor connected to the first sub-trace and the second sub-trace at a first node, connected to the first sub-trace and the second sub-trace at a second node, and configured to detect a change in impedance across the first node and the second node, wherein
   the resilient tape node is configured to determine that the first tape sub-trace is broken or damaged based on the impedance monitor detecting a first change in impedance, and the resilient tape is configured to determine that the second sub-trace is broken or damaged based on the impedance monitor detecting a second change in impedance.

12. The resilient tape node of claim 5, wherein each of the plurality of sub-traces have the same resistance or impedance.

13. The resilient tape node of claim 5, wherein the PCB is a flexible PCB.

14. The resilient tape node of claim 5, the plurality of sub-traces comprising a first trace with a first width and a second trace with a second width larger than the first width.

15. A method comprising:
- activating a first redundant component of a circuit, the circuit comprising a first component, a plurality of redundant traces comprising a first redundant trace connecting the first component to a first redundant component and a second redundant trace connecting the first component to a second redundant component;
- measuring a first impedance across the plurality of redundant traces;
- storing the measured first impedance;
- after a period of use, measuring a second impedance across the plurality of redundant traces; responsive to the measured second impedance being different from the stored first impedance by a first amount, determining that the first redundant trace has been damaged; and
- responsive to the determining that the first redundant trace has been damaged, deactivating the first redundant component and activating the second redundant component, wherein the second redundant component is configured to perform the same functions as the first redundant component.

16. The method of claim 15, wherein an impedance of the first redundant trace is different from an impedance of the second redundant trace.

17. The method of claim 15, wherein an impedance of the first redundant trace is same as an impedance of the second redundant trace.

18. The method of claim 15, further comprising:
- storing the measured second impedance;
- after another period of use, measuring a third impedance across the plurality of redundant traces;
- responsive to the measured third impedance being different from the stored second impedance by a second amount, determining that the second redundant trace has been damaged; and
- responsive to the determining that the second redundant trace and the first redundant trace have been damaged, activating a third redundant component of the circuit, wherein the circuit further comprises a third redundant trace connecting the first component to the third redundant component.

19. The method of claim 15, wherein the first redundant component and the second redundant component are a same type of component.

* * * * *